United States Patent
Uyeno et al.

(10) Patent No.: US 12,372,658 B2
(45) Date of Patent: Jul. 29, 2025

(54) NEGATIVE OBSTACLE DETECTOR USING MICRO-ELECTRO-MECHANICAL SYSTEM (MEMS) MICRO-MIRROR ARRAY (MMA) BEAM STEERING

(71) Applicant: Raytheon Company, Arlington, VA (US)

(72) Inventors: Gerald P. Uyeno, Tucson, AZ (US); Sean D. Keller, Tucson, AZ (US); Benn H. Gleason, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 1201 days.

(21) Appl. No.: 17/068,517

(22) Filed: Oct. 12, 2020

(65) Prior Publication Data
US 2024/0288584 A1      Aug. 29, 2024

(51) Int. Cl.
*G01S 17/931* (2020.01)
*G01S 7/48* (2006.01)
(Continued)

(52) U.S. Cl.
CPC .......... *G01S 17/931* (2020.01); *G01S 7/4802* (2013.01); *G01S 7/4817* (2013.01); *G01S 17/86* (2020.01)

(58) Field of Classification Search
CPC .... G01S 17/931; G01S 7/4802; G01S 7/4817; G01S 17/86
See application file for complete search history.

(56) References Cited

U.S. PATENT DOCUMENTS

| 5,404,375 A | 4/1995 | Kroeger et al. |
| 5,638,164 A * | 6/1997 | Landau ................. G01S 17/89 250/342 |

(Continued)

FOREIGN PATENT DOCUMENTS

| AU | 2005213216 | 8/2005 |
| AU | 2005213231 | 8/2005 |

(Continued)

OTHER PUBLICATIONS

"MEMS Mirror Array—Beam Steering Mode", [Online]. Retrieved from the Internet: <www.youtube.com/watch?v=wHIUU3kKtzM>, (Aug. 10, 2017), 2 pgs.

(Continued)

*Primary Examiner* — Isam A Alsomiri
*Assistant Examiner* — Joseph C Fritchman
(74) *Attorney, Agent, or Firm* — Schwegman Lundberg & Woessner, P.A.

(57) ABSTRACT

An obstacle detector uses a Micro-Electro-Mechanical System (MEMS) Micro-mirror Array (MMA) for scanning one or more laser beams over a field of regard to identify negative obstacles in the path of an autonomous vehicle or in other limited visual environments. In certain examples, the MEMS MMA may be segmented to concurrently and independently form and scan multiple laser beams over the field of regard to interrogate different areas, concurrently identify and verify candidate objects, maintain specified spatial resolution or implement a composite scan pattern. The MEMS MMA may be configured to concurrently and independently scan multiple laser beams at different wavelengths or spectral bands. The MEMS MMA may be configured to adjust a size, divergence or intensity profile of the laser beam(s) or to provide wavefront correction to compensate for atmospheric distortion. In certain embodiments, (Continued)

the MEMS MMA may be provided with tip, tilt and piston actuation of the mirrors to form the laser beams.

23 Claims, 16 Drawing Sheets

(51) Int. Cl.
  *G01S 7/481* (2006.01)
  *G01S 17/86* (2020.01)

(56) References Cited

U.S. PATENT DOCUMENTS

| | | | |
|---|---|---|---|
| 5,854,702 A | 12/1998 | Ishikawa et al. | |
| 6,181,450 B1 | 1/2001 | Dishman et al. | |
| 6,271,953 B1 | 8/2001 | Dishman et al. | |
| 6,327,063 B1 | 12/2001 | Rockwell | |
| 6,526,352 B1 | 2/2003 | Breed et al. | |
| 6,567,574 B1 | 5/2003 | Ma et al. | |
| 6,792,028 B2 | 9/2004 | Cook et al. | |
| 6,816,315 B1 | 11/2004 | Ai et al. | |
| 6,958,851 B2 | 10/2005 | Cicchiello | |
| 6,990,350 B2 | 1/2006 | Davis et al. | |
| 7,212,703 B2 | 5/2007 | Wu | |
| 7,286,766 B2 | 10/2007 | Shelton et al. | |
| 7,304,296 B2 | 12/2007 | Mills et al. | |
| 7,324,757 B2 | 1/2008 | Wilson et al. | |
| 7,379,668 B2 | 5/2008 | Blumenthal | |
| 7,593,641 B2 | 9/2009 | Tegge, Jr. | |
| 7,626,152 B2 | 12/2009 | King et al. | |
| 7,627,251 B2 | 12/2009 | Walther et al. | |
| 7,650,082 B2 | 1/2010 | Yamada et al. | |
| 7,660,235 B2 | 2/2010 | Alicherry et al. | |
| 7,667,190 B2 | 2/2010 | Mills et al. | |
| 7,884,997 B2 | 2/2011 | Goodno | |
| 7,969,558 B2 | 6/2011 | Hall | |
| 8,049,889 B2 | 11/2011 | Fest | |
| 8,094,081 B1 | 1/2012 | Bruzzi et al. | |
| 8,164,037 B2 | 4/2012 | Jenkins et al. | |
| 8,189,179 B2 | 5/2012 | Silny et al. | |
| 8,301,027 B2 | 10/2012 | Shaw et al. | |
| 8,305,578 B1 | 11/2012 | Mudge et al. | |
| 8,311,372 B2 | 11/2012 | Anderson et al. | |
| 8,362,410 B2 | 1/2013 | King et al. | |
| 8,364,334 B2 | 1/2013 | Au et al. | |
| 8,368,889 B2 | 2/2013 | Schwiegerling et al. | |
| 8,380,025 B2 | 2/2013 | Anderson et al. | |
| 8,400,619 B1 | 3/2013 | Bachrach et al. | |
| 8,463,080 B1 | 6/2013 | Anderson et al. | |
| 8,767,190 B2 | 7/2014 | Hall | |
| 8,823,848 B2 | 9/2014 | Chipman et al. | |
| 8,983,293 B2 | 3/2015 | Frankel et al. | |
| 9,407,363 B2 | 8/2016 | Aoki | |
| 9,473,768 B2 | 10/2016 | Uyeno et al. | |
| 9,477,135 B1 | 10/2016 | Uyeno et al. | |
| 9,632,166 B2 | 4/2017 | Trail et al. | |
| 9,857,226 B2 | 1/2018 | LeMaster et al. | |
| 9,904,081 B2 | 2/2018 | Uyeno et al. | |
| 9,927,515 B2 | 3/2018 | Keller et al. | |
| 9,946,259 B2 | 4/2018 | Keller et al. | |
| 10,062,175 B2 | 8/2018 | Uyeno et al. | |
| 10,148,056 B2 | 12/2018 | Uyeno et al. | |
| 10,243,654 B1 | 2/2019 | Keller et al. | |
| 10,267,915 B2 | 4/2019 | Uyeno et al. | |
| 10,321,037 B2 | 6/2019 | Uyeno et al. | |
| 10,381,701 B2 | 8/2019 | Motoi | |
| 10,444,492 B2 | 10/2019 | Hopkins et al. | |
| 10,718,491 B1 | 7/2020 | Raring et al. | |
| 10,969,598 B2 | 4/2021 | Fest et al. | |
| 10,998,689 B2 | 5/2021 | Tong et al. | |
| 11,042,025 B2 | 6/2021 | Uyeno et al. | |
| 11,127,150 B2 | 9/2021 | Uyeno et al. | |
| 11,333,879 B2 | 5/2022 | Uyeno et al. | |
| 11,477,350 B2 | 10/2022 | Uyeno et al. | |
| 11,550,146 B2 | 1/2023 | Uyeno et al. | |
| 11,650,412 B2 | 5/2023 | Uyeno et al. | |
| 11,837,840 B2 | 12/2023 | Uyeno et al. | |
| 12,066,574 B2 | 8/2024 | Uyeno et al. | |
| 2002/0141689 A1 | 10/2002 | Qian et al. | |
| 2002/0196506 A1 | 12/2002 | Graves et al. | |
| 2003/0062468 A1* | 4/2003 | Byren | G02B 27/0037 |
| | | | 250/216 |
| 2003/0081321 A1 | 5/2003 | Moon et al. | |
| 2003/0185488 A1 | 10/2003 | Blumenthal | |
| 2004/0072540 A1 | 4/2004 | Wilson et al. | |
| 2004/0081466 A1 | 4/2004 | Walther et al. | |
| 2004/0141752 A1 | 7/2004 | Shelton et al. | |
| 2004/0258415 A1 | 12/2004 | Boone et al. | |
| 2005/0013003 A1 | 1/2005 | Marom | |
| 2005/0031255 A1 | 2/2005 | Schroeder et al. | |
| 2005/0100339 A1 | 5/2005 | Tegge | |
| 2005/0122566 A1 | 6/2005 | Cicchiello | |
| 2005/0288031 A1 | 12/2005 | Davis et al. | |
| 2006/0038103 A1 | 2/2006 | Helmbrecht | |
| 2007/0031157 A1 | 2/2007 | Yamada et al. | |
| 2007/0036480 A1 | 2/2007 | Wu | |
| 2008/0050064 A1 | 2/2008 | Sakai et al. | |
| 2009/0202254 A1 | 8/2009 | Majumdar et al. | |
| 2010/0030473 A1 | 2/2010 | Au et al. | |
| 2010/0149533 A1 | 6/2010 | Fest | |
| 2010/0166430 A1 | 7/2010 | Alten | |
| 2012/0002973 A1 | 1/2012 | Bruzzi et al. | |
| 2012/0008133 A1 | 1/2012 | Silny et al. | |
| 2012/0114337 A1 | 5/2012 | Aoki | |
| 2012/0155885 A1 | 6/2012 | Hannah et al. | |
| 2012/0168605 A1 | 7/2012 | Milanovic | |
| 2013/0271818 A1 | 10/2013 | Bastien et al. | |
| 2014/0063299 A1 | 3/2014 | Fest et al. | |
| 2015/0099476 A1 | 4/2015 | Beals | |
| 2015/0172218 A1 | 6/2015 | Beshai | |
| 2015/0311981 A1 | 10/2015 | Inagaki et al. | |
| 2015/0378242 A1 | 12/2015 | Auxier et al. | |
| 2016/0003677 A1 | 1/2016 | Pezzaniti et al. | |
| 2016/0043800 A1 | 2/2016 | Kingsbury et al. | |
| 2016/0234703 A1 | 8/2016 | Aldana et al. | |
| 2016/0294472 A1 | 10/2016 | Palmer et al. | |
| 2017/0003392 A1* | 1/2017 | Bartlett | G01S 17/42 |
| 2017/0176990 A1* | 6/2017 | Keller | G01S 17/42 |
| 2017/0293137 A1 | 10/2017 | Zhao et al. | |
| 2018/0180872 A1 | 6/2018 | Hopkins et al. | |
| 2018/0231715 A1 | 8/2018 | Bishop et al. | |
| 2018/0267299 A1 | 9/2018 | Sitter, Jr. et al. | |
| 2018/0356287 A1 | 12/2018 | Trent et al. | |
| 2019/0011885 A1* | 1/2019 | Dürr | G02B 27/0944 |
| 2019/0066320 A1 | 2/2019 | Uyeno et al. | |
| 2019/0124277 A1* | 4/2019 | Mabuchi | H04N 25/535 |
| 2019/0154921 A1 | 5/2019 | Xing et al. | |
| 2020/0013181 A1 | 1/2020 | Uyeno et al. | |
| 2020/0096639 A1* | 3/2020 | Panas | G01S 17/931 |
| 2020/0244359 A1 | 7/2020 | Csonka et al. | |
| 2021/0088776 A1 | 3/2021 | Uyeno et al. | |
| 2021/0091854 A1 | 3/2021 | Uyeno et al. | |
| 2021/0092260 A1 | 3/2021 | Uyeno et al. | |
| 2022/0137395 A1 | 5/2022 | Uyeno et al. | |
| 2022/0229160 A1 | 7/2022 | Uyeno et al. | |
| 2022/0229285 A1 | 7/2022 | Uyeno et al. | |
| 2022/0232144 A1 | 7/2022 | Uyeno et al. | |
| 2022/0236383 A1 | 7/2022 | Uyeno et al. | |
| 2023/0101430 A1 | 3/2023 | Keller et al. | |

FOREIGN PATENT DOCUMENTS

| | | |
|---|---|---|
| CN | 1393710 | 1/2003 |
| CN | 1393711 | 1/2003 |
| CN | 1393712 | 1/2003 |
| CN | 1393714 | 1/2003 |
| CN | 110226103 | 9/2019 |
| DE | 102011104023.8 B4 | 7/2019 |
| EP | 2667142 A1 | 11/2013 |
| EP | 2137567 | 4/2018 |
| EP | 2533003 B1 | 8/2018 |
| WO | 2005125193 | 12/2005 |
| WO | 2006042696 | 4/2006 |
| WO | 2010032224 | 3/2010 |

(56) References Cited

FOREIGN PATENT DOCUMENTS

| WO | 2010049076 | 5/2010 |
|---|---|---|
| WO | 2014145792 | 9/2014 |
| WO | WO-2014200581 A2 | 12/2014 |
| WO | 2023064085 | 4/2023 |

OTHER PUBLICATIONS

Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.
Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.
Tsou, et al., "Extended-image spatial tracking technique for deep-space optical downlinks", Proc. SPIE 3762, Adaptive Optics Systems and Technology, (Sep. 27, 1999), 101-109.
Tuantranont, et al., "Optical beam steering using MEMS-controllable microlens array", Sensors and Actuators A: Physical vol. 91, Issue 3, (Jul. 15, 2001), 363-372.
"U.S. Appl. No. 16/871,602, Non Final Office Action mailed Nov. 9, 2020", 18 pgs.
"U.S. Appl. No. 16/871,602, Notice of Allowance mailed Feb. 24, 2021", 5 pgs.
"U.S. Appl. No. 16/871,602, Response filed Feb. 8, 2021 to Non Final Office Action mailed Nov. 9, 2020", 12 pgs.
"U.S. Appl. No. 17/007,917, Non Final Office Action mailed Aug. 3, 2021", 35 pgs.
"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.
"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.
Ayral, J.-L., et al., "Phase-conjugate Nd:YAG laser with internal acousto-optic beam steering", Optics Letters, vol. 16, No. 16, (Aug. 15, 1991), 1225-1227.
Chiu, Yi, et al., "Shape-Optimized Electrooptic Beam Scanners: Analysis, Design, and Simulation", Journal of Lightwave Technology, vol. 17, No. 1, (Jan. 1999), 108-114.
Kim, et al., "Demonstration of large-angle nonmechanical laser beam steering based on LC polymer polarization grating", Proc. of SPIE vol. 8052 80520T, (May 13, 2011).
Kim, Jihwan, et al., "Wide-angle, nonmechanical beam steering using thin liquid crystal polarization gratings", Proc. of SPIE, vol. 7093, (2008), 12 pgs.
King, D F, et al., "3rd-Generation 1280 × 720 FPA development status at Raytheon Vision Systems", Proc. of SPIE vol. 6206 62060W-1, (2006), 16 pgs.
Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.
Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.
Siegman, A. E., "Unstable optical resonators for laser applications", Proceedings of the IEEE, vol. 53, Issue 3, (Mar. 1965), 277-287.
Wang, Jinxue, et al., "Doppler Winds Lidar Technology Development and Demonstration", AIAA-2005-6772, Space 2005, Long Beach, California, Aug. 30-1, 2005, 11 pgs.
Yamamoto, R., et al., "Evolution of a Solid State Laser", Proc. SPIE 6552, Laser Source Technology for Defense and Security III, 655205, (May 10, 2007), 11 pgs.
U.S. Appl. No. 17/007,917, filed Aug. 31, 2020, Electronically Steered Inter-Satellite Optical Communication System with Micro-Electromechanical (MEM) Micromirror Array (MMA).
"Mirrorcle Technologies MEMS Mirrors—Technical Overview", Mirrorcle Technologies, Inc., (2018), 7 pgs.
"U.S. Appl. No. 17/007,917, Response filed Dec. 1, 2021 to Non Final Office Action mailed Aug. 3, 2021", 16 pgs.
"U.S. Appl. No. 17/007,917, Notice of Allowance mailed Jan. 10, 2022", 14 pgs.
"U.S. Appl. No. 17/007,917, Supplemental Notice of Allowability mailed Apr. 19, 2022", 2 pgs.
U.S. Appl. No. 17/009,453 U.S. Pat. No. 11,837,840, filed Sep. 1, 2020, MEMS Micro-Mirror Array Laser Beam Steerer for Simultaneous Illumination of Multiple Tracked Targets.
U.S. Appl. No. 17/150,330, filed Jan. 15, 2021, Optical System for Object Detection and Location Using a Micro-Electro-Mechanical System (MEMS) Micro-Mirror Array (MMA) Beamsteering Device.
"U.S. Appl. No. 17/150,286, Non Final Office Action mailed Mar. 9, 2022", 13 pgs.
"U.S. Appl. No. 17/150,286, Response filed Apr. 29, 2022 to Non Final Office Action mailed Mar. 9, 2022", 12 pgs.
"U.S. Appl. No. 17/150,286, Notice of Allowance mailed Jun. 17, 2022", 10 pgs.
"U.S. Appl. No. 17/152,023, Notice of Allowance mailed Sep. 21, 2022", 9 pgs.
"U.S. Appl. No. 17/009,453, Non Final Office Action mailed Apr. 13, 2023", 30 pgs.
"U.S. Appl. No. 17/009,453, Response filed May 31, 2023 to Non Final Office Action mailed Apr. 13, 2023", 14 pgs.
"International Application Serial No. PCT US2022 044535, International Search Report mailed Jun. 6, 2023", 4 pgs.
"International Application Serial No. PCT US2022 044535, Written Opinion mailed Jun. 6, 2023", 11 pgs.
"U.S. Appl. No. 17/009,453, Final Office Action mailed Jul. 11, 2023", 29 pgs.
"U.S. Appl. No. 17/009,453, Response filed Jul. 21, 2023 to Final Office Action mailed Jul. 11, 2023", 11 pgs.
"U.S. Appl. No. 17/009,453, Notice of Allowance mailed Aug. 7, 2023", 11 pgs.
"U.S. Appl. No. 17/009,453, Supplemental Notice of Allowability mailed Aug. 28, 2023", 6 pgs.
Anderegg, Jesse, "Coherently Coupled High Power Fiber Arrays", Proc. of SPIE 6102, Fiber Lasers III: Technology, Systems, and Applications 61020U, (2006), 6 pgs.
Augst, S J, "Coherent and spectral beam combining fiber lasers", Proc. SPIE 8237, Fiber Lasers IX: Technology, Systems, and Applications, 823704, (Feb. 13, 2012), 11 pgs.
Bing, Dong, "Dynamic Aberration Correction for Conformal Window of High-Speed Aircraft Using Optimized Model-Based Wavefront Sensorless Adaptive Optics", Sensors, vol. 16, No. 9, (Sep. 2, 2016), 13 pgs.
Bishop, Bob, "Northrop Grumman-Developed Beacon Illuminator Laser Proves Reliability in Airborne Laser Ground, Air Tests", Northrop Grumman Corporation, [Online]. Retrieved from the Internet: URL: https: news.northropgrumman.com news releases northrop-grumman-developed-beacon-illuminator-laser-proves-reliability-in-airborne-laser-ground-air-tests?, (Aug. 13, 2009), 2 pgs.
Fan, T Y, "Laser Beam Combining or High-Power, High-Radiance Sources", IEEE Journal of Selected Topics in Quantum Electronics, vol. 11, No. 3, (May Jun. 2005), 567-577.
Kelchner, Bryan, "ABL beam control segment", SPIE, vol. 3381, (Sep. 8, 1998), 6 pgs.
Redmond, Shawn, "Active coherent beam combining of diode lasers", Optics Letters vol. 36, No. 6, (Mar. 15, 2011), 999-1001.
"U.S. Appl. No. 17/150,330, Notice of Allowance mailed Apr. 10, 2024", 10 pgs.

\* cited by examiner

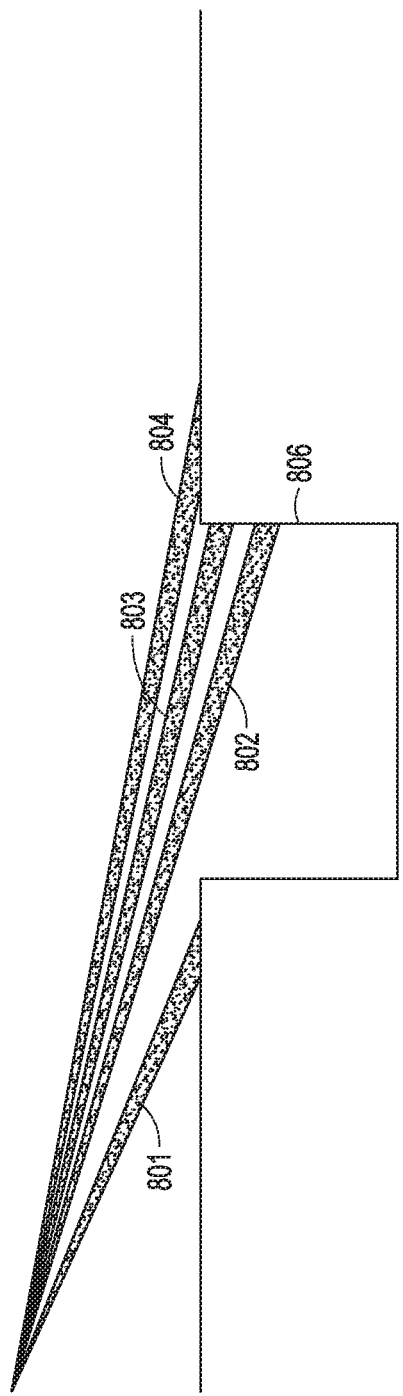
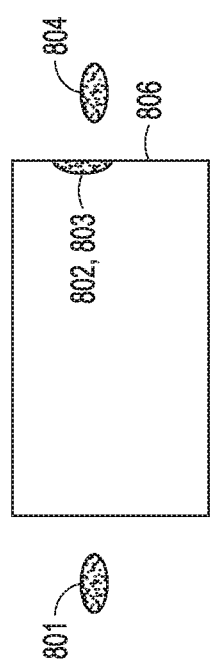
FIG. 8A
FIG. 8B

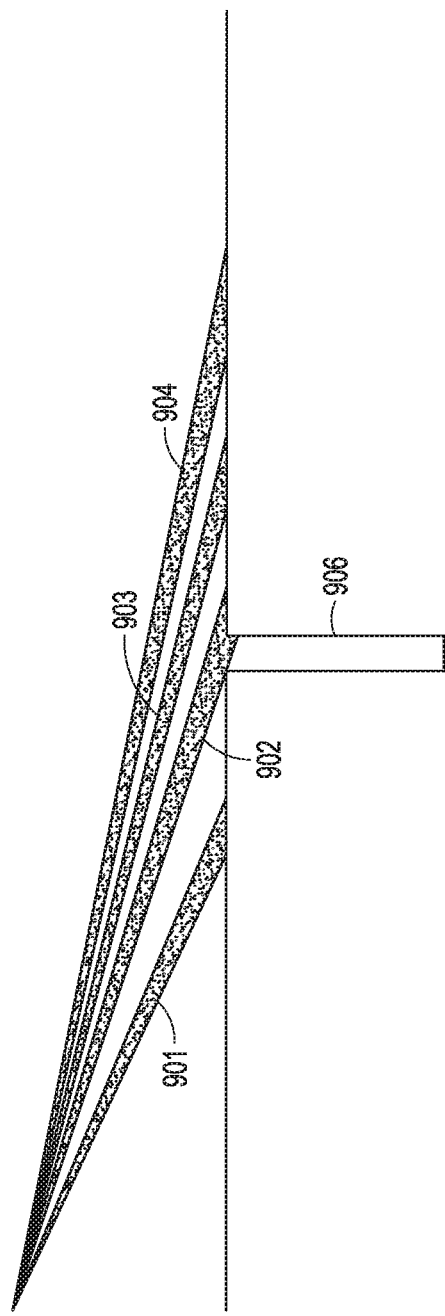
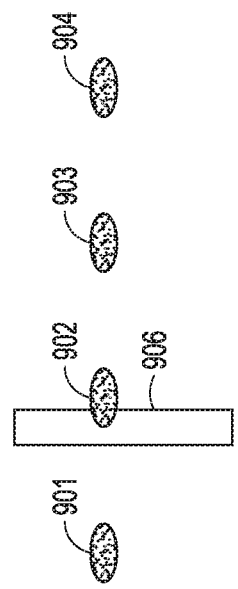
FIG. 9A
FIG. 9B

NEGATIVE OBSTACLE DETECTOR USING MICRO-ELECTRO-MECHANICAL SYSTEM (MEMS) MICRO-MIRROR ARRAY (MMA) BEAM STEERING

BACKGROUND OF THE INVENTION

Field of the Invention

This invention relates to negative obstacle detection as may be used in autonomous vehicles or limited visual environments.

DESCRIPTION OF THE RELATED ART

Unmanned ground vehicles (UGVs) include remote-driven or self-driven land vehicles that can carry cameras, sensors, communications equipment, or other payloads. Self-driven or "autonomous" UGVs are essentially robotic platforms that are capable of operating outdoors and over a wide variety of terrain with little or no operator input. To perform optimally, autonomous vehicles should be capable of detecting obstacles in different types of terrain to identify traversable paths. Conventional implementations of autonomous vehicles can include laser detection and ranging (LADAR) sensors that are used to measure the range to each point within a scan area that sweeps across a horizontal line. Other conventional implementations either flood illuminate an entire scene with a single pulse or scan a laser line using rotating mirrors or similar rotating structure. Further, on-board global positioning system (GPS) and inertial navigation system (INS) sensors can provide geo-location information and information that indicates vehicle dynamics (e.g., position and altitude of the vehicle, as well as the velocity and angular velocity of the vehicle). Together, these systems can map traversable paths for the autonomous vehicle.

Positive obstacles are characterized by the presence of an object such as a large rock, tree, another vehicle etc. in a vehicle's path of travel. Negative obstacles are characterized by absences including, but not limited to, voids, holes, and/or depressions in a vehicle's path of travel. Detecting an absence in a pathway (e.g., a hole) has proven quite difficult. Conventional implementations can fail to detect such negative obstacles with sufficient accuracy for the vehicle to complete the traverse. Further, problems with conventional systems are exacerbated when the autonomous vehicle is operating at speed. Positive obstacles are much easier to identify using conventional systems, but this system has certain advantages for positive obstacles also.

Although, conventional LADAR systems can detect large negative obstacles by scanning a laser beam across a line, many cannot detect small negative obstacles. Commercially available scanners typical rely on rotating mirrors to scan a laser beam across an area in front of a UGV, which is referred to as a field of regard (FOR). In these examples, the system captures information about the entire FOR at a constant rate. These commercially available systems provide no option to decrease the area associated with the FOR or increase the data refresh rate to capture information faster as terrain or vehicle speed may require. Other scanning methods such as gimbaled lasers, or Risley prisms exist.

Conventional horizontal scan LADAR systems cannot detect negative obstacles with such precision because, for example, they cannot adapt the scan region within the FOR, and scene or image based object detection is equally unsuited, as shadows can be incorrectly identified as negative obstacles. Further, scene or image based object detection can be compromised in low visibility and/or night conditions. Finally flash based LADAR systems are large and the required laser power to scan the scene prohibits implementation on small platforms.

U.S. Pat. No. 6,526,352 to Breed describes a vehicle having two data acquisition modules arranged on sides of the vehicle, each including a GPS receiver and antenna for enabling the vehicle's position to be determined and a linear camera which provides one-dimensional images of an area on first and second sides of the vehicle. Each module can also includes a scanning laser radar adapted to transmit waves downward in a plane perpendicular to the road and receive reflected radar waves to provide information about the distance between the laser radar and the road which constitutes information about the road. The data is obtained and stored to form a map database. The laser radar scanning system may include a motor drive for slowly scanning large angles and a Lithium Niobate acoustic wave system for rapidly scanning small angles.

One conventional approach is detailed in U.S. Patent Application Publication 2010/0030473 to Au, which describes augmentation of autonomous guidance systems to implement scanning and stored range scans in variable sized buffers and is incorporated herein by reference in its entirety. As described, the scan information can be translated into an estimated ground plane using information from the GPS and INS systems. The estimated ground plane is used to classify traversable areas, non-traversable areas, and obstacle areas for navigation.

U.S. Pat. No. 9,946,259 to Keller describes an obstacle detector configured to identify negative obstacles in a vehicle's path responsive to steering a laser beam to scan high priority areas in the vehicle's path is provided. Beam steering is performed using a high-speed, solid-state state liquid crystal waveguide (LCWG) beam scanner. The high priority areas can be identified dynamically in response to the terrain, speed, and/or acceleration of the vehicle. In some examples, the high priority areas are identified based on a projected position of the vehicles tires. A scan path for the laser, scan rate, and/or a scan location can be dynamically generated to cover the high priority areas. The scan path may revisit a potential negative obstacle to determine reality.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

Aspects and embodiments described herein are directed to an obstacle detector that incorporates methods and apparatuses for identifying positive and negative obstacles in the path of an autonomous vehicle or in other limited visual environments, and, in particular, to obstacle detections systems and methods which include a Micro-Electro-Mechanical System (MEMS) Micro-mirror Array (MMA) for scanning laser beams over a field of regard. In certain examples, the MEMS MMA may be segmented to concurrently and independently form and scan multiple laser beams over the field of regard. The MEMS MMA may be configured to concurrently and independently scan multiple laser beams at different wavelengths or spectral bands. The MEMS MMA may be configured to adjust a size intensity profile of the laser beam(s) or to provide wavefront correction to compensate for atmospheric distortion. In certain embodiments, the MEMS N/MIA may be provided with tip, tilt and piston actuation of the mirrors to form the laser beams.

In an embodiment, an obstacle detector comprises a laser scanner device including one or more optical sources that emit laser energy, a MEMS MMA to concurrently form and independently steer a plurality of laser beams over a field of regard, a range detector that generates range information based on reflection of the laser beams and at least one processor. The processor(s) partition the MEMS MMA in to a plurality of segments, each including a plurality of mirrors that tip and tilt to form and steer a laser beam. The processor(s) define discrete scan patterns for each beam, generate control signals to direct the MEMS MMA to form and steer the laser beam, and identify an indicator of at least one negative obstacle using the range information from the plurality of laser beams.

In different embodiments, the discrete scan patterns may be defined in a variety of ways to scan the field or regard to identify negative obstacles. In one approach, multiple laser beams are used to simultaneously scan different areas within the field of regard. In another approach, one or more laser beams are used to execute a base scan pattern to search for candidate negative objects. As such candidates are identified and validated, additional laser beams are used to scan a specific location at which a candidate is detected while the base scan is ongoing. The number of additional laser beams adapts as additional candidates are identified and then validated. In another approach, multiple laser beams are simultaneously scanned at different ranges or speed within the field of regard. In another approach, the number of laser beams is adapted based on a range or relative speed to maintain a specified spatial resolution on a target. In another approach, the scan patterns are defined to form a composition scan pattern with a finer spatial resolution on target on target and a coarser spatial resolution away from the target center. The obstacle detection system and method may move from one approach to another, combine approaches and adapt with circumstances.

In different embodiments, the MEMS MMA may be partitioned into a plurality of sections, each section including one or more segments. The mirrors in the different sections comprise reflective coatings designed to reflect at different wavelengths such that the plurality of laser beams provide for multi-spectral scanning of the field of regard. In one approach, the different sections produce laser beams that span the visible, SWIR and LWIR bands. In another approach, a section produces a broadband laser beam that spans a specified band e.g., Visible, SWIR or LWIR. Multiple other sections produce narrowband laser beams at different wavelengths within the specified band. The broadband laser beam may, for example, be used to identify candidate negative objects, which are then revisited by one or more of the narrowband laser beams for validation. The system may evaluate the range information over the specified band to select the one or more narrowband laser beams to validate the negative object.

In an embodiment, the processor may evaluate range information at different wavelengths to identify the material composition of the negative object. This information may be used to select the narrowband laser beam to validate the negative object. This information may also be used to decide whether the negative object is traversable or should be avoided.

In an alternate embodiment, the mirrors in each section may have the same broadband coating but are illuminated by different narrowband lasers to produce the different wavelength laser beams. For example, the coating may reflect all wavelengths in the MWIR and the sources may emit at different wavelengths within the MWIR.

In different embodiments, the plurality of mirrors within each segment that form and steer a laser beam may be used to, for example, control the size or intensity profile of the laser beam to improve spatial resolution or to provide wavefront corrections to compensate for atmospheric distortion. These capabilities may be enhanced with a MEMS MMA in which the mirrors translate in a third axis orthogonal to a plane containing the first and second orthogonal axis for "tip" and "tilt". The "translation" or "piston" action of the mirrors improves the optical quality of sizing, intensity profile or wavefront correction.

These and other features and advantages of the invention will be apparent to those skilled in the art from the following detailed description of preferred embodiments, taken together with the accompanying drawings, in which:

BRIEF DESCRIPTION OF TUE DRAWINGS

FIGS. 8A and 8B are diagrams of an obstacle detector and beam geometry, according to aspects of the invention;

FIGS. 9A and 9B are diagrams of an obstacle detector and beam geometry, according to aspects of the invention;

FIGS. 14A-1413 are illustrations of an embodiment in which the MEMS MMA is partitioned into a plurality of sections each comprising a plurality of mirrors that are provided with reflective coatings at different wavelengths to concurrently form and independently scan focused optical beams at different wavelengths;

DETAILED DESCRIPTION OF THE INVENTION

Figure 1A:
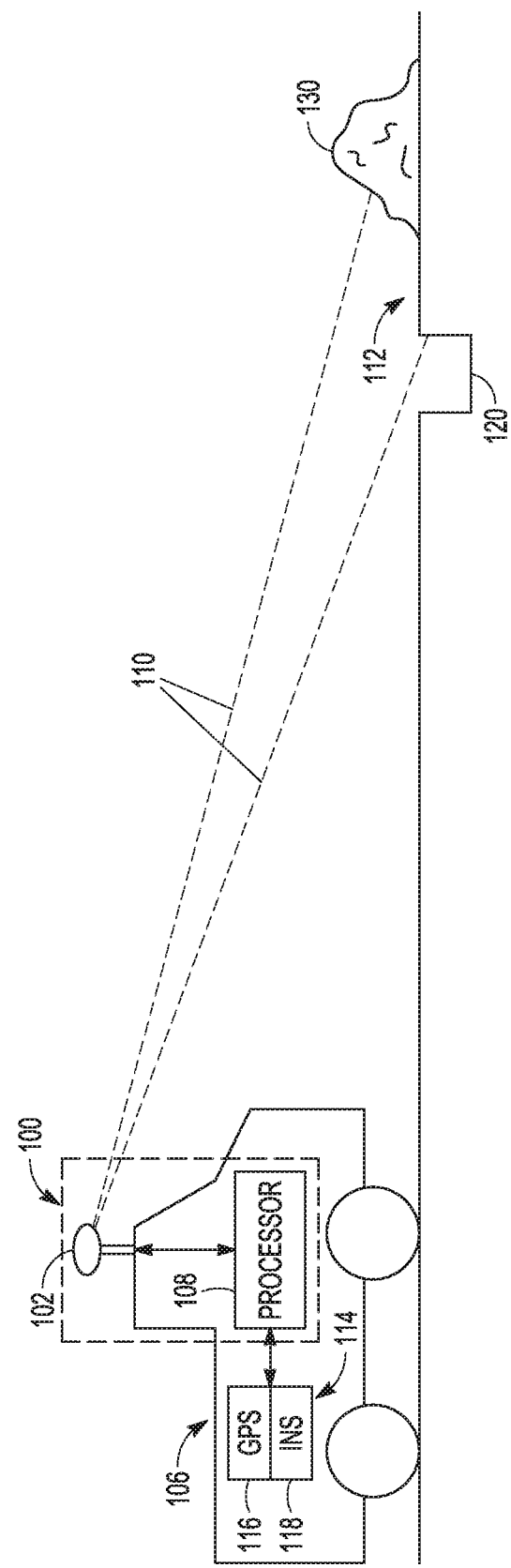
FIGS. 1A and 1B are block diagrams of an obstacle detector installed on an autonomous vehicle according to aspects of the invention.

Aspects and embodiments are directed to a negative obstacle detector that may be mounted on a vehicle to enable autonomous operation of the vehicle. In some examples, the detector can be mounted on manned vehicles and provide assistance (e.g., collision avoidance, object avoidance, etc.) to human drivers. Autonomous vehicle as used herein is intended to include completely autonomous vehicles as well as vehicles with human operators, where driving operation can be assisted or taken over by computer systems. A negative obstacle detector may also be used in limited visual environments such as may be encountered by fire fighters or rescue workers.

As discussed in more detail below, embodiments of the detector include a laser scanner device, such as a laser range finder, which includes or is based on a Micro-Electro-Mechanical System (MEMS) Micro-Mirror Array (MMA), that concurrently and independently forms and steers one or more laser beam from the range finder transmitter to target high priority areas in front of the autonomous vehicle and a detector that provides range to the area illuminated by the laser beam. Discontinuities in the range information can be used to identify obstacles, which allow the autonomous vehicle to avoid any holes at high speed that create navigational barriers. In one example, discontinuity is established by range and intensity information indicative of a hole or other negative obstacle, where multiple returns show the same range and intensity at different angles, which can be indicative of a wall or a hole (see e.g., Table I).

In some embodiments, the laser scanner device can be coupled with global positioning systems, and inertial navigation systems to allow a processing component to analyze terrain and create traversable pathways for the autonomous vehicle to follow. In the absence of GPS or INS data, a video camera and processor for tracking objects within the camera field of view can be used. The processing component can also be configured to dynamically generate a scan pattern and/or scan locations based on current terrain, historic information, and/or vehicle information. The scan pattern and/or location can be generated to specifically target areas in front of the wheels of the autonomous vehicle or areas where the wheels will be based on inputs from the UGV navigation system. Further examples use historical terrain information to facilitate identification of obstacles, including voids, and can also be used to dynamically determine the scan pattern or scan locations. In further examples, user preferences can also be specified and used in generating scan patterns and/or identifying scan locations by the processing component.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1B:
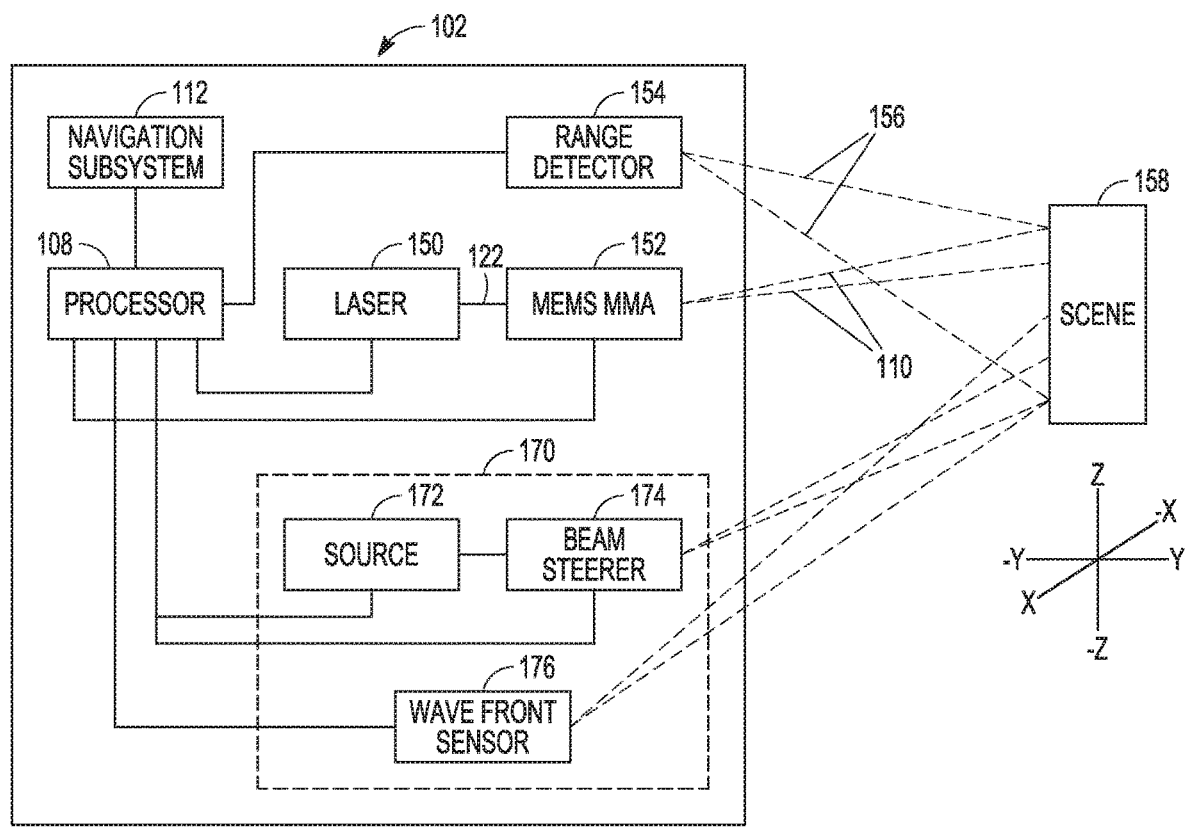

Referring to FIGS. 1A and 1B, there is illustrated a block diagram of one example of an object detector installed on an autonomous vehicle according to certain aspects. The object detector 100 includes a laser scanner device 102. The laser scanner device includes a laser (e.g., diode or similar emitter) 150, a MEMS MMA 152 to concurrently form and independently steer one or more pulsed laser beams 110 across a field of regard ("FOR"), and a range finding detector 154 capable of determining the range to the target shown from received laser returns 156 from a scene 158. Range finding detector 154 may include a single or small number of pixels for each laser beam. The pixels are "range gated" to detect the returning pixels. The laser scanner device 102 steers one or more laser beams 110 to targeted areas in a potential travel path 112 of the autonomous vehicle 106. In some embodiments, the laser scanner device 102 is connected or includes a processing component 108, having at least one processor. The processing component is configured to process range data received from the laser scanner device 102 and identify obstacles (e.g., hole 120 or obstacle 130) in proximity to the autonomous vehicle.

In one particular example, the processing component 108 is configured to identify discontinuities in range data from the laser scanner device 102 to detect negative obstacles. In one example, discontinuity is established by range and intensity information indicative of a hole or other negative obstacles, where multiple returns show the same range and intensity at different angles. In further embodiments, the processing component 108 is configured to tailor object detection based on the properties of an object in the vehicle path. For example, discussed in greater detail below are processes for object detection where beam divergence is less than the angle subtended by the object and where beam divergence is not less than the angle subtended by the hole (see e.g., FIGS. 8A-8B and 9A-9B). The MEMS MMA can be used to control the beam size or intensity profile by focusing or defocusing the beam at the target, which may improve resolution in these cases.

Returning to FIG. 1, shown is a single laser scanner device 102 implemented on the autonomous vehicle 106. In other embodiments, it is appreciated that multiple laser scanners can be implemented. In some embodiments, multiple scanning devices or multiple laser beams from a single scanning device can facilitate detection and estimation of obstacle size. In some embodiments, the scanning device can also be positioned differently on the autonomous vehicle 106. In yet other examples, the laser scanning device may include a range finder that can be separated into a laser emitter with laser waveguide and a separate laser detector, and the present disclosure includes different configurations than the example illustrated in FIG. 1. The laser scanner device 102 may include a laser source (e.g., a laser diode or other optical source), a laser steering device such as a MEMS MMA, optics (e.g., lens, etc.) and processing electronics for controlling the laser source and steering device. In one example, the laser scanner device includes a laser range finder for capturing range data.

According to some embodiments, the processing component 108 can be connected to a navigation subsystem 114. The navigation subsystem 114 can be used to automatically control direction, velocity, and other operating characteristics of the autonomous vehicle. In some examples, the navigation subsystem 114 includes a. GPS component 116 and an INS component 118 that provide geo-location data and operational information (e.g., speed, acceleration, etc.) on the vehicle. The geo-location data and operational information can be used to determine real world position and/or control operation (including direction of travel, speed, etc.) of the autonomous vehicle 106.

According to one embodiment, the processing component 108 is configured to analyze information on a planned travel path, for example, obtained from the navigation subsystem 114. The processing component 108 can determine high priority areas to scan responsive to analyzing the planned travel path and, for example, estimating the position of the vehicle's wheels along the travel path. In another embodiment, the processing component 108 can also determine high priority areas from receipt of information on possible obstacles based on camera systems that aid in UGV navigation. In other examples, the processing component 108 can estimate the position of a vehicle's motion surfaces (e.g. treads or other locomotive components, wheels, feet, etc.) along the planned travel path. According to another embodiment, the processing component 108 can be configured to tailor scan areas based on the locomotive components of the autonomous vehicle. For example, some autonomous vehicles can be capable of entering a detected obstacle. The processing component 108 can be configured to determine the depth of the obstacle (e.g., the hole) based on determined range information. The depth of the obstacle can be used by the processing component 108 to determine if the hole can be entered, travelled over, or if the vehicle must go around.

In one example, the processing component 108 dynamically generates a scan pattern and/or a scan location to target the high priority areas in the planned travel path. In further examples, the processing component continuously identifies high priority areas in a FOR responsive to data from the navigation subsystem 114 and/or the laser scanner device 102, responsive to identifying obstacles and/or responsive to changes from any planned or estimated travel path. In some embodiments, the processing component 108 includes information on historic routes and any obstacle information recorded along those routes. The processing component 108 can incorporate historic information during determination of high priority areas. For example, the processing component 108 can target (e.g., identify as high priority) previously identified obstacles for scanning. According to another example, user preferences may also be used to target scan areas or scan locations for the negative object detector. For example, the processing component 108 can be configured to analyze any user preferences in defining the high priority areas to scan. For example the user may specify certain preferences including any one or more, or any combination of the following: vehicle characteristics (e.g., tire position, size of vehicle, width of vehicle, etc.); minimum scan rates or scan ranges; scan pattern/location/area for a current speed or current speed range; terrain based preferences (e.g., known road and known conditions (e.g., paved instead of off-road); weather conditions; route preferences to select routes that: optimize travel time, optimize fuel savings, set a level of acceptable mission risk, and weigh the inputs from different sources differently based on accuracy of past data or quality of current data, among other options.

According to some embodiments, the processing component 108 can be connected to a wavefront correction subsystem 170. In certain examples, it is desirable to compensate for atmospheric distortion, which varies with time. A source 172 is positioned to emit electromagnetic radiation e.g. SWIR in an optical beam preferably having a "flat-top" intensity profile. Source 172 may be a pulsed laser at 1064 nm. A beam steerer 174 such as a rotating mirror, LCWG or MEMS MMA steers the beam to illuminate scene 158. A wavefront sensor 176 measures the wavefront of the reflected optical beam. Processor 108 generates command signals to configure the MEMS MMA to compensate for the atmospheric distortion.

Figure 2:
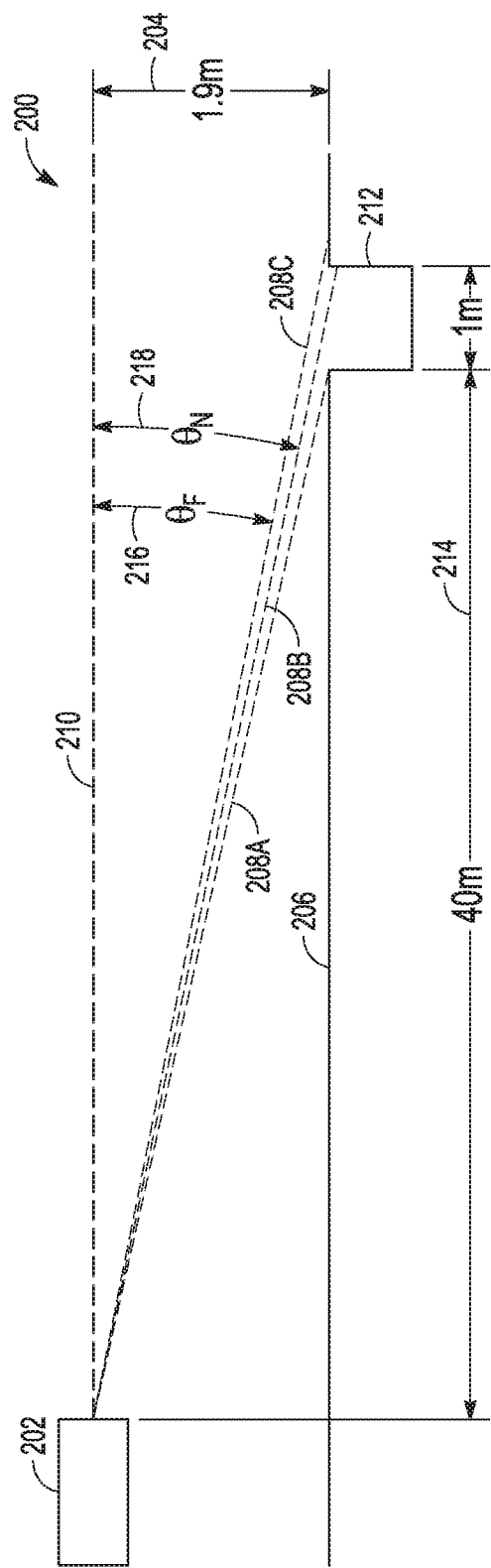
FIG. 2 is a block diagram of an obstacle detector geometry according to aspects of the invention.

FIG. 2 illustrates an example implementation of a negative object detector 200 and an example detection case. Other embodiments include adjustable range finding distances, scan intervals, etc., for one or more concurrently formed and scanned beams at the same or different wavelengths all of which may be tailored to any mission parameters. In FIG. 2, the negative object detector is in a fixed position to illustrate capability to detect small negative obstacles at distance. A laser scanner device 202 is positioned 1.9 meters (at 204) above a travel surface 206. In one example, the laser scanner device includes a laser range finder. An emitted laser beam is illustrated having different angles as measured from a projected horizon line 210 drawn parallel to the travel surface. For a negative obstacle of one meter in length 212 (an example case) that is forty meters from the laser range finder 202 (an example case), the first beam 208A establishes a range to the travel surface, the second beam 208B shows a range into the negative obstacle at angle theta-sub-n 218, and the third beam 208C shows a range to the travel surface beyond the negative obstacle 212 at angle theta-sub-f. The difference between theta-sub-n and theta-sub-f was calculated at seven one hundredths of a degree for this embodiment. In different embodiments, the MEMS MMA can be configured to concurrently form and scan multiple beams at the same location to gather additional range information. In one example, lasers can be selected based on divergence properties where double the laser's divergence is less than a desired resolution (e.g., less than seven one hundredths of a degree). According to some embodiments, signal processing analysis is also implemented to determine the range where the divergence condition cannot be met. In further embodiments, the maximum range where the divergence condition can be met is set for the processing component 108. In other embodiments, the maximum range can be captured as a user preference.

Figure 3:
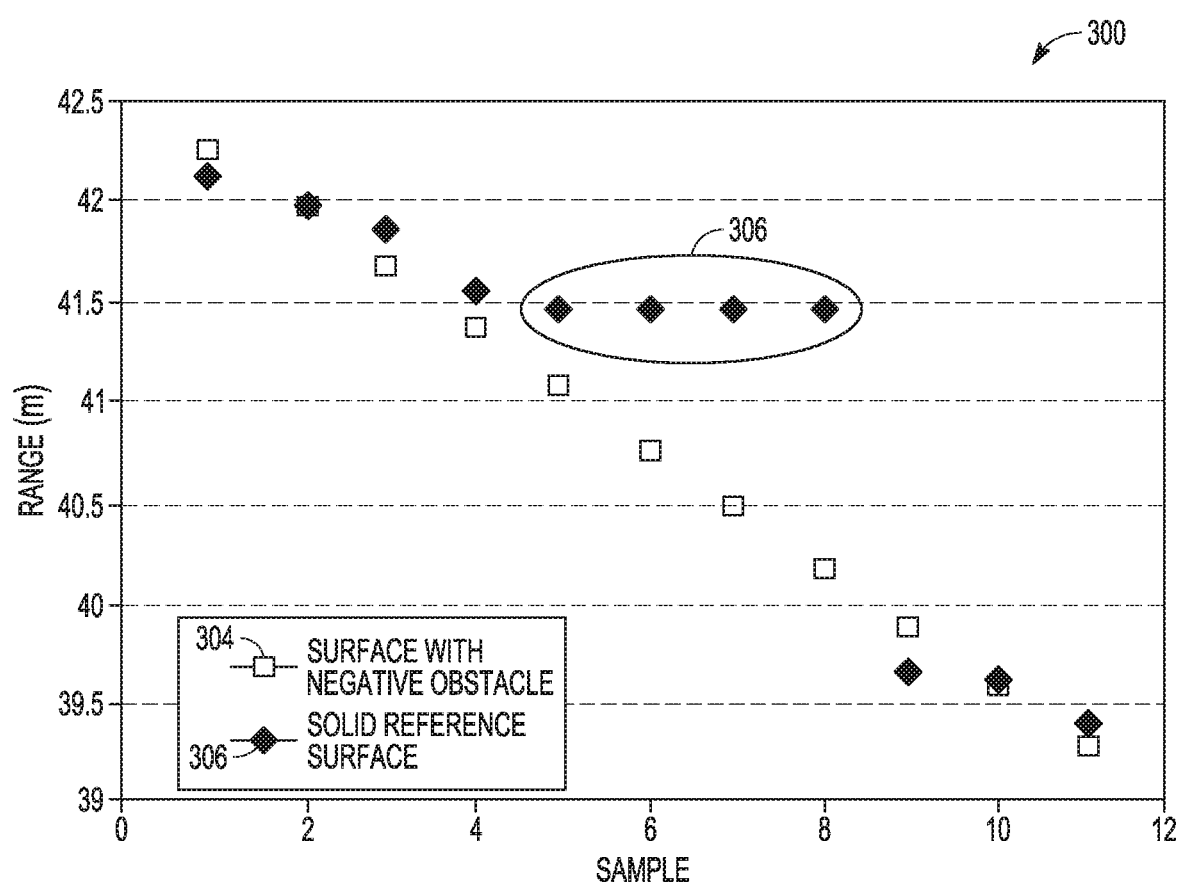
FIG. 3 is a graph of obstacle data obtained in accord with aspects of the invention.

FIG. 3 shows a plot 300 of range data captured for an even surface (302—depicted with squares) in conjunction with range data captured for a surface with a negative obstacle (304 depicted with diamonds). At 306, shown is a discontinuity in the surface having the negative obstacle. A processing component of an obstacle detector (e.g., 108 of FIG. 1) can be configured to detect discontinuity in a surface to identify the negative obstacle. With a MEMS MMA, discontinuity information can be gather from multiple beams scanning the negative obstacle at the same or different time, the same or different scan frequencies or ranges and at multiple different wavelengths. In some examples, the processing component can generate a projection for an expected surface reading, and identify discontinuity based on deviation from the projection. In other examples, the processing component can also analyze historic scan information or topographical information on a surface to identify discontinuity in obtained scan information. In further examples, information on a surface may also be generated by the processing component using information from navigation systems, which may also include GPS and/or INS information, as well as historic information obtained on a given surface.

FIGS. 8A-8B and 9A-9B illustrate example object detection scenarios. FIGS. SA-8B illustrate where beam divergence is less than the angle subtended by the object (e.g., hole 806). For example, beam 801 returns information on a travel surface prior to detecting the object. Beams 802 and 803 return information on a detected object, and the multiple returns from within the object (e.g., the hole 806) match. The walls can be measured, and for example, a depth of the object can be determined (e.g., using continued scans as a vehicle approaches the obstacle). The bottom portion of FIG. 8B shows the beams 801-804 and hole 806 from a top view.

Table I provides comparative information on beam, range, and an intensity return for FIGS. 8A-8B, to further illustrate the differences in the object detection cases shown in FIGS. 8A-8B and 9A-9B. The single range and intensity return for 802 and 803 are the result of a wall of a negative obstacle.

TABLE I

| Beam | Range | Intensity |
| --- | --- | --- |
| 801 | X | Y |
| 802 | X + 1.1 | Y |
| 803 | X + 1.1 | Y |
| 804 | X + 2 | Y |

FIGS. 9A-9B illustrate where beam divergence is not less than the angle subtended by the object (e.g., hole 906) with a side and top view of the emitted beams. Beam 901 returns information on a travel surface prior to reaching the object. Beam 902 is split by the object so that there is not a distinct return that matches an object (e.g., hole 906). Beams 903 and 904 return information on the travel surface in an area past the object. As illustrated in Table II, the intensity of the split return is approximately equal to the intensities of un-split returns (e.g., beams 901, 903, and 904—see Table II. below). Additionally, the range of separation of the split returns is very small (i.e., between X+1.1 and C). The MEMS MMA ability to control beam size (divergence) may be used to get beam 902 to act more like beams 801-804.

TABLE II

| Beam | Range | Intensity |
| --- | --- | --- |
| 901 | X | Y |
| 902 | X + 1.1, C | A, B |
| 903 | X + 2 | Y |
| 904 | X + 3 | Y |

According to some embodiments, any detection of a split return can trigger a more intensive mode of operation for an object detector For example, when operating in the intensive mode the object detector can use the entire bit depth to increase sensitivity in measuring distance, and may also task additional processing capability to accommodate required processing speeds (e.g., assign additional processors, pause or lock out current executing processes in favor of the intensive scanning mode, etc.). Additionally, new scan patterns, locations, and/or faster refresh rates can be triggered responsive to entering the intensive mode of operation.

Figure 11A:
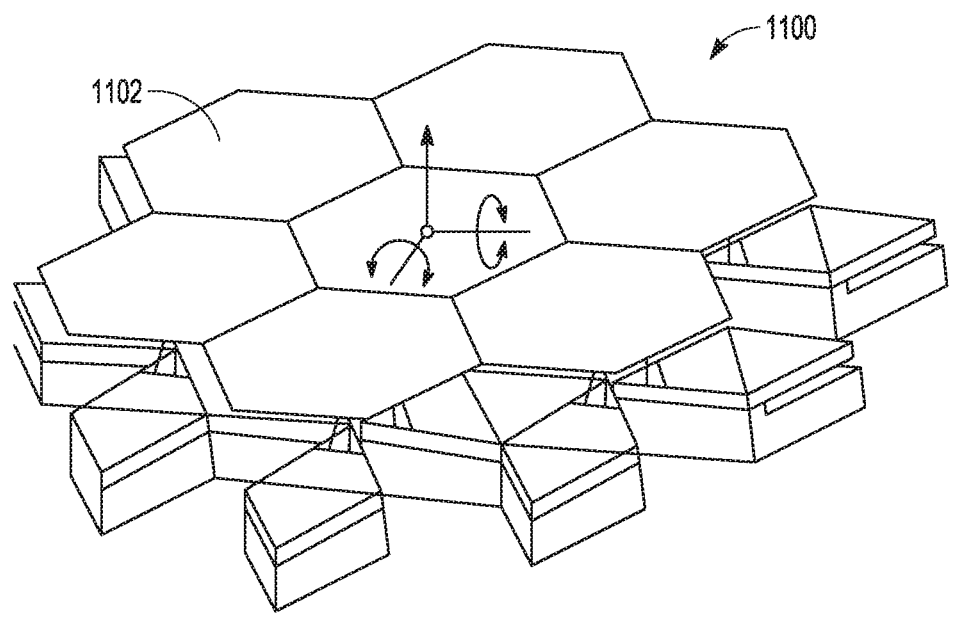
FIGS. 11A and 11B are illustrations of an embodiment of a Tip/Tilt/Piston ("TTP") MEMS MMA and a single mirror actuated to tip, tilt and translate (piston) to form and steer the one or more laser beams.
Figure 11B:
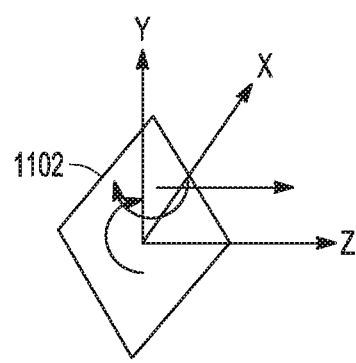

As best shown in FIGS. 11A-11B, a Micro-Electro-Mechanical System (MEMS) Micro-mirror Array (MMA) 1100 comprises a plurality of independently and continuously controllable mirrors 1102 to form and steer the laser beam(s). Each mirror is capable of at least "Tip" (rotation about an X-axis) and "Tilt" (rotation about a Y-axis). In preferred embodiments, each mirror is also capable of "Piston" (translation along a Z-axis, perpendicular to the XY plane) where the X, Y and Z are orthogonal axes in a three-dimensional space. The Tip and Tilt can be used to control the size and intensity profile of a beam to control spatial resolution. The Piston capability can be used to improve the formation and scanning of the optical beam by approximating a continuous surface across the micro-mirrors, which reduces unwanted diffraction to increase power in the focused optical beam. The Piston capability can also be used to provide selective deviations from the continuous mirror surface to compensate for, for example, atmospheric distortion. The MEMS MMA is preferably capable of steering an output laser beam over a steering range of at least −10°×+10° in tip and tilt and +/−10 microns (at least one-half wavelength in either direction) piston at a rate of at least 1 KHz (<1 millisecond). The independently controllable mirrors can be adaptively segmented to form any number of optical beams, adjust the size/power of a given optical beam, and to generate multi-spectral optical beams. Further, the MEMS MMA must have a sufficient number of mirrors, mirror size/resolution, fill factor, range of motion, response time, response accuracy and uniformity across the array. One such MEMS MMA is described in U.S. Pat. No. 10,444,492 entitled "Flexure-Based, Tip-Tilt-Piston Actuation Micro-Array", which is hereby incorporated by reference. This MEMS MMA is currently being commercialized by Bright Silicon technologies for "digitally controlling light."

Figure 12A:
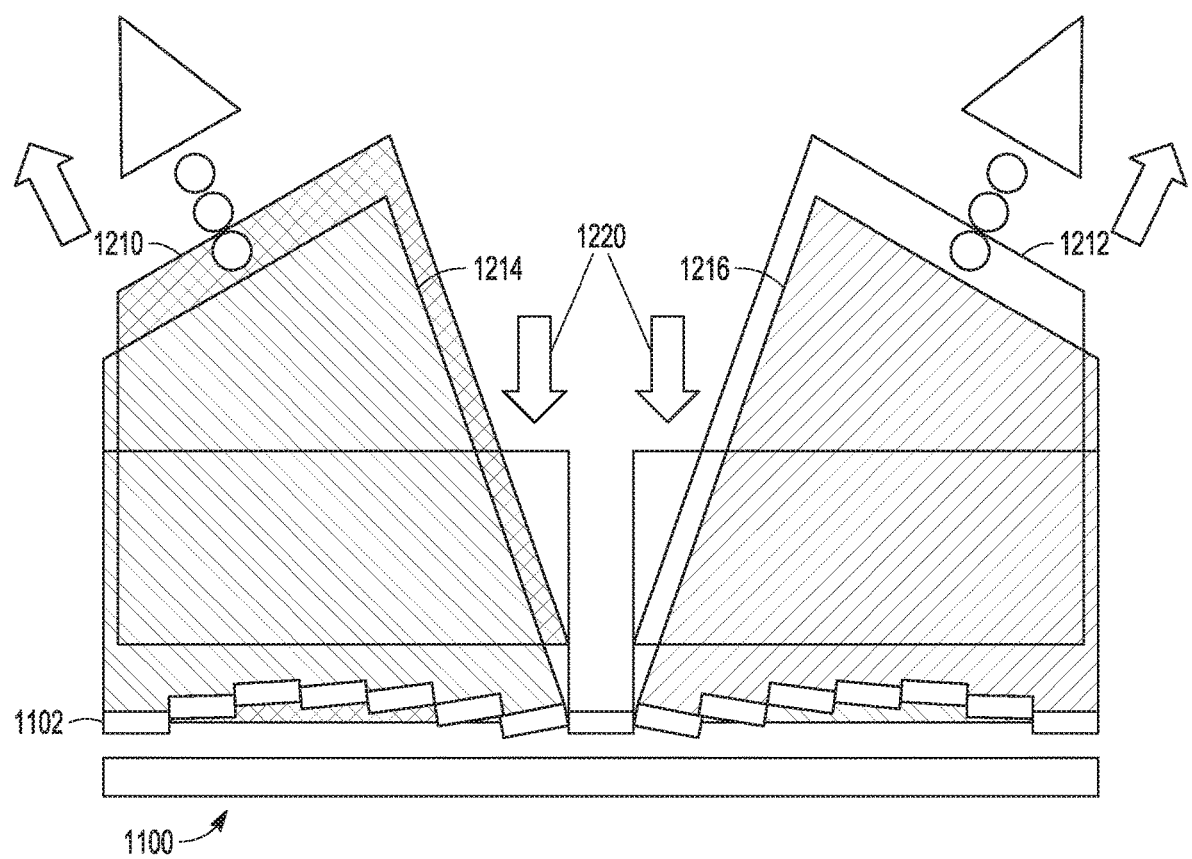
FIGS. 12A-12b are illustrations of an embodiment in which the MEMS MMA is partitioned into a plurality of segments each comprising a plurality of mirrors that form and independently scan a laser beam.
Figure 12B:
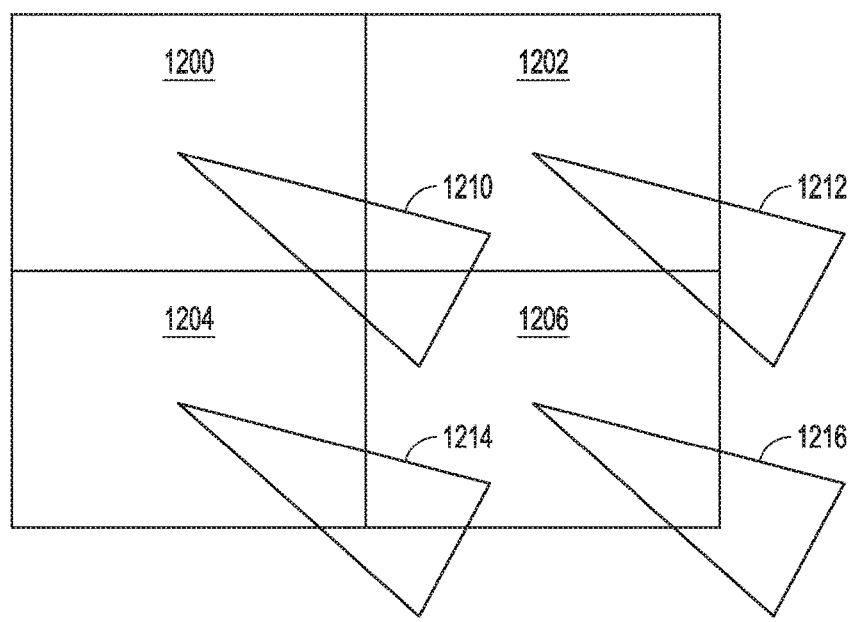

As illustrated in FIGS. 12A-12B, responsive to command signals from the one or more processors MEMS MM A 1100 is partitioned into four segments 1200, 1202, 1204 and 1206 each including a plurality of mirrors 1102. The segments do not need to be equally sized, can be any portion of the array and can be changed on the fly in number, size or location. In response to command signals, the MEM S MMA tips/tilts/pistons the mirrors in each segment to concurrently and independently form and scan optical beams 1210, 1212, 1214 and 1218 over different portions of a scene from one or more source beams 1220 (a single source may illuminate the entire MEMS MMA or different sources (different wavelengths) may illuminate different sections of the MEMS MMA). Additional piston actuation may be included to form the beam e.g., control beam size (divergence) or intensity profile or to correct for atmospheric distortion in some or all of the optical beams.

The "segmenting" capability of the MEMS MMA provides great flexibility for the object detector and laser scanning device to define different scan patterns for a plurality of laser beams that are used concurrently and independently to scan the field of regard. The number of beams, power, size, intensity profile, wavelength can be adapted to perform multiple scans for different purposes or to work together to provide a composite scan the delivers enhanced range information as shown in FIGS. 13A-13D.

Figure 13B:
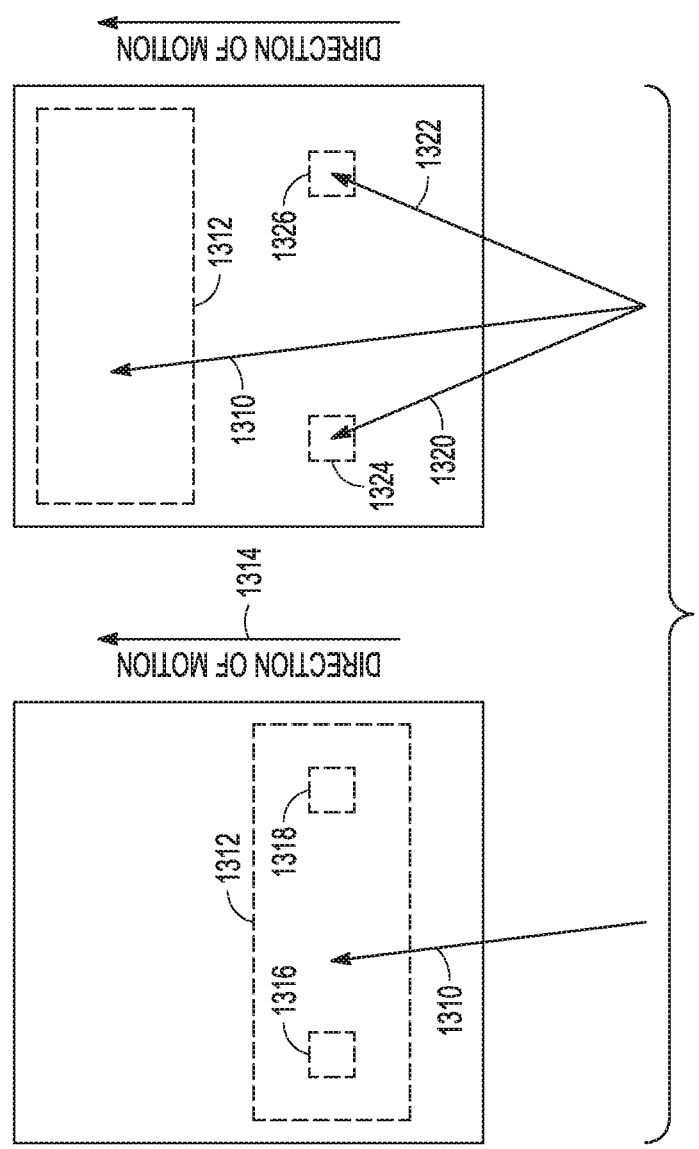
FIGS. 13A-13D are illustrations of different scan patterns for the plurality of laser beams.
Figure 13A:
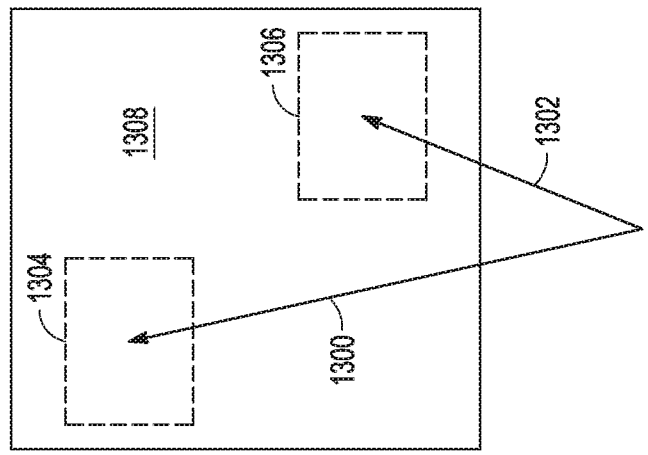

As illustrated in FIG. 13A, a pair of laser beam 1300 and 1302 are concurrently formed to independently scan different areas 1304 and 1306 of the field of regard 1308. These could be, for example, the paths in front of the left and right front tires of an autonomous vehicle. The beams may be of the same or different size, intensity profile, power, range, scan frequency or wavelength depending on other inputs to the system.

As illustrated in FIG. 1313, a laser beam 1310 follows a base scan pattern back and forth across the field or regard to cover an area 1312 that moves with a direction of motion 1314. As candidate negative objects 1316 and 1318 are identified within area 1312, responsive to control signals the MEMS MMA is reconfigured to concurrently form and independently scan laser beams 1320 and 1322 at the specific locations 1324 and 1326 where the candidate negative objects were detected. Depending upon the source configuration that illuminates the MEMS MMA, power may be shifted from laser beam 1310 to laser beams 1320 and 1322 while the candidate negative objects are verified. These additional laser beams can adapt as candidate negative objects are verified (beam goes away) or new candidates are identified (new beam is created). Importantly, the base scan pattern may continue while these additional laser beams are used to verify the candidate negative objects. The size, intensity profile, wavelength, scanning frequency etc. of the additional laser beams 1320 and 1322 may differ from the main laser beam 1310 to verify the candidate object. Multiple different beams may be used to verify a single candidate object. For example, the beams may have different wavelengths or different spatial resolutions.

Figure 13D:
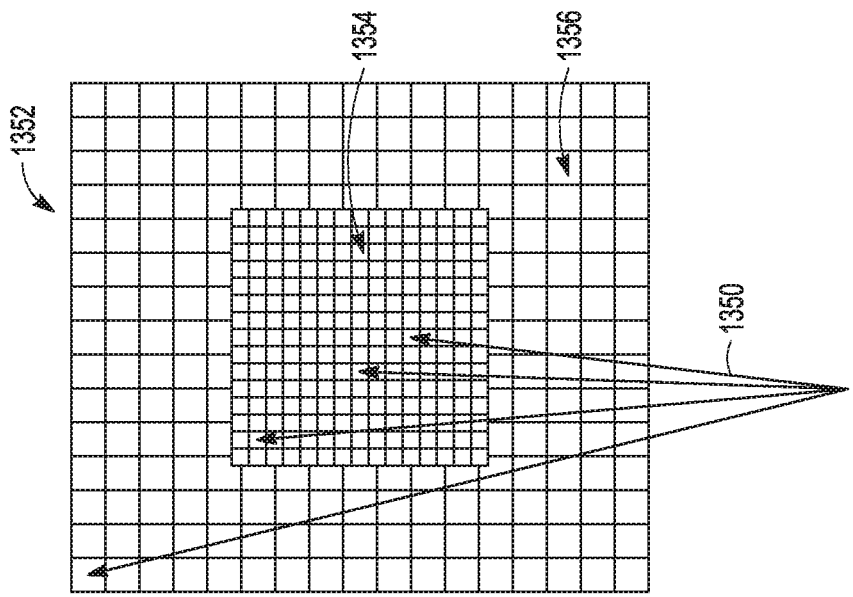
Figure 13C:
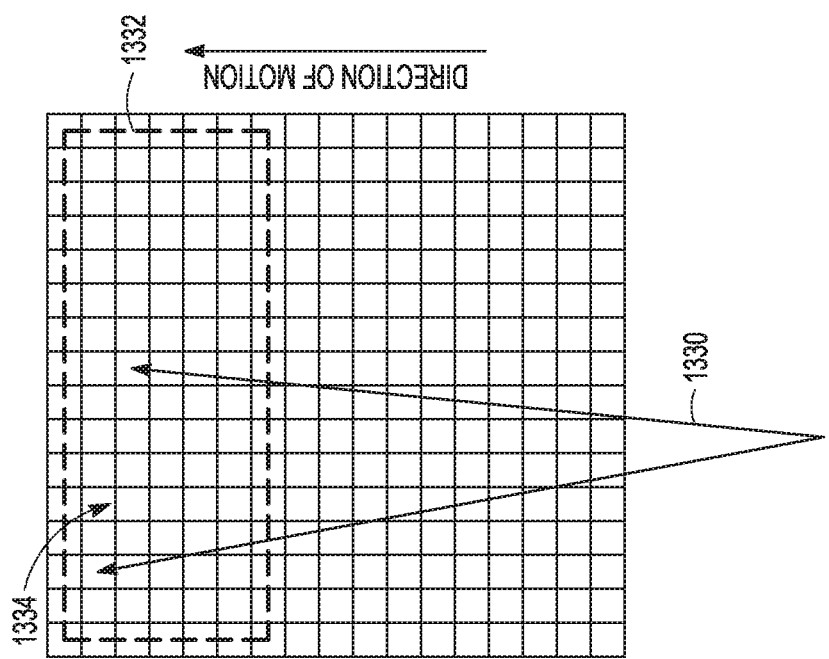
Figure 14A:
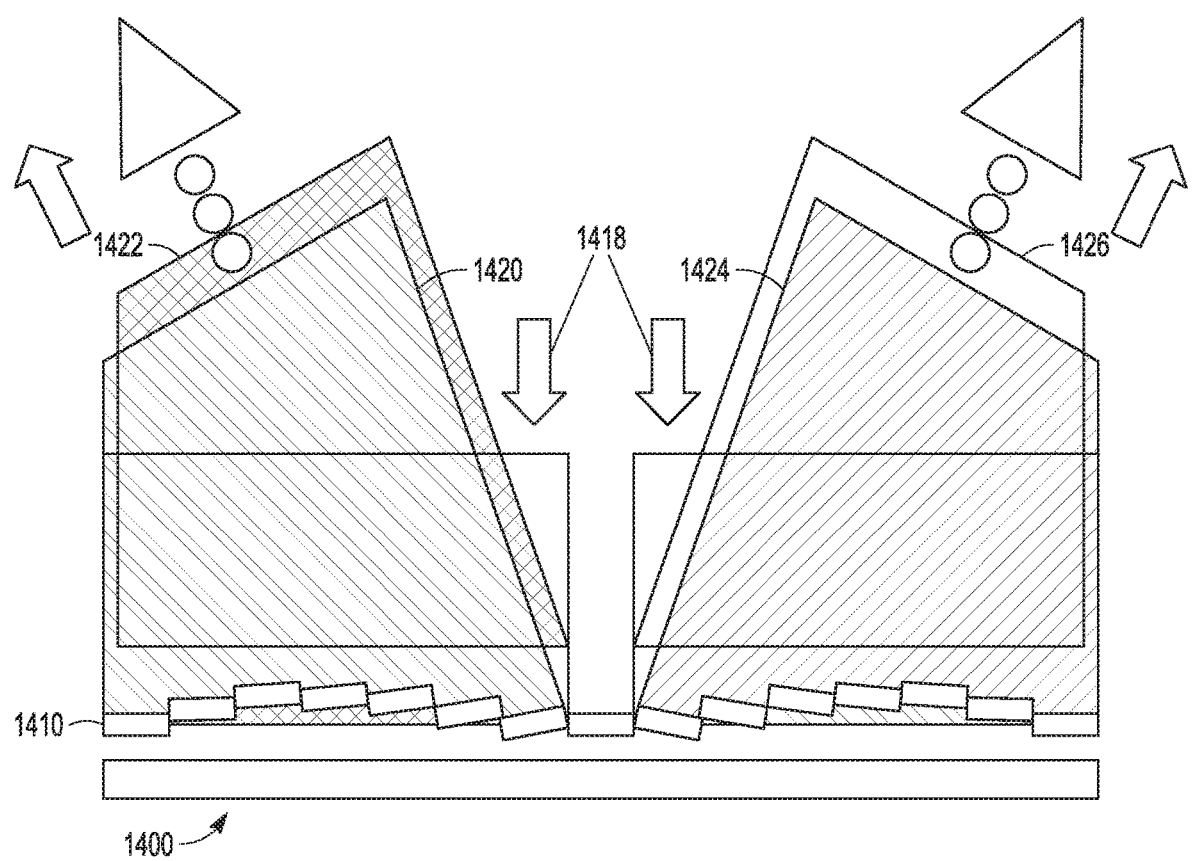
Figure 14B:
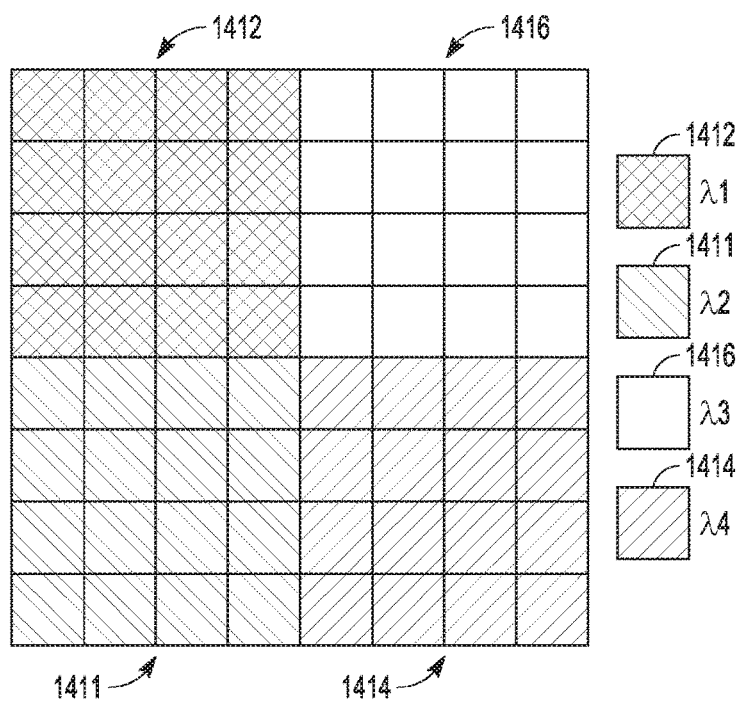

As illustrated in FIG. 13C, the number of laser beams 1330 that are cooperatively scanned over an area 1332 in a field of regard is adapted based on a range or a relative speed to the field of regard (e.g. speed of an autonomous vehicle and range to the scanned area) to maintain a specified spatial resolution 1334 on target.

As illustrated in FIG. 13D, the number of laser beams 1350, their size and respectively discrete scan patterns, that area cooperatively scanned over the field of regard are defined to form a composition scan pattern 1352 of an area 1354 of the field of the regard with a fine spatial resolution on target in a center of the area and an area 1356 of the field of regard with a coarse spatial resolution on target away from the center 1358.

As illustrated in FIGS. 14A-14D, responsive to control signals from the one or more processors a MEMS MMA 1400 is partitioned into four sections, each including at least one segment with a plurality of mirrors 1410. The mirrors in the different sections are provided with reflective coatings 1411, 1412, 1414 and 1416 at different wavelengths. The sections do not need to be equally sized and can be any portion of the array. The segments within each section can be changed on the fly in number, size or location. A single broadband source 1418 may be positioned to emit electromagnetic radiation that spans all of the wavelengths onto the entire MEMS MMA. It is more efficient to use multiple sources 1418 positioned to emit radiation at the bands or individual wavelengths corresponding to a respective section. In response to command signals, the MEMS MMA tips/tilts/pistons the mirrors in each segment to independent form and scan laser beams 1420, 1422, 1424 and 1426 over different or the same area of the field of regard. Additional piston actuation may be included to compensate control the size or intensity profile of a given beam or correct for atmospheric distortion in some or all of the laser beams at the different wavelengths. In response to control signals, the MEMS MMA may form and scan all of the optical beams according to a base scan pattern over an area of the field of regard to provide multi-spectral illumination. Alternately, the MEMS MMA may scan one or more of the laser beams according to the base scan pattern(s) over the area of the field of regard while scanning one or more additional laser beams at different wavelengths over a different portion of the scene e.g. candidate negative objects. The wavelengths of the additional beams may be selected based on evaluating range information from the broadband beam used for the base scan. This information may provide an estimate of the material properties of the negative object, hence optimize selection of the wavelength for verification or to inform a decision as to whether the negative object may be traversed or should be avoided. In addition, one or more sections at a given wavelength may be partitioned into multiple segments thereby generating a plurality of independently scanned laser beams at the given wavelength. For example, different sections may have coatings that span a visible band of at least 450 nm-750 nm, a SWIR band of at least 900 nm-2000 nm, and a MWIR of at least 3000 nm-5000 nm to enable the detector to scan for objects at these three different bands. Alternately, the MEMS MMA may have a single broadband section e.g. Visible, SWIR or MWIR and multiple narrowband sections at discrete wavelengths in the band. Or, the MEMS MMA could have sections for each of the Visible, SWIR and MWIR bands and multiple narrowband sections for each. The MEMS MMA provides great flexibility to adapt largely on the fly the number of beams and the wavelength composition of those beams.

Figure 15:
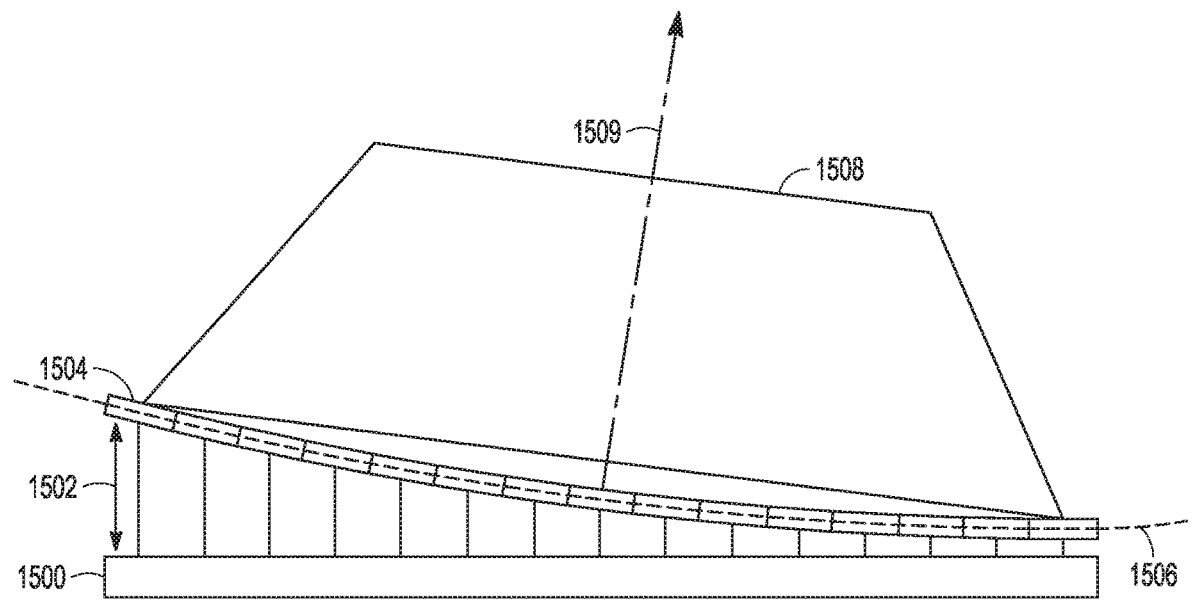
FIG. 15 is an illustration of using tip, tilt and piston mirror actuation to approximate a continuous optical surface to control the size or intensity profile of a laser beam.

As illustrated in FIG. 15, responsive to command signals from one or more processors a MEMS MMA 1500 tips, tilts and pistons (translates 1502) mirrors 1504 to approximate a continuous mirror surface 1506 to both focus and scan laser beam 1508 along boresight 1509. The mirror surface 1506 can be formed to control the size of the laser beam or its intensity profile. The continuous mirror surface 1506 approximates a single surface free-space reflective optical mirror. Each mirror can suitably translate at least ½ wavelength and typically several wavelengths in either direction to form the continuous mirror surface 1506. The edge discontinuities between mirrors and loss of power are minimized.

Figure 16:
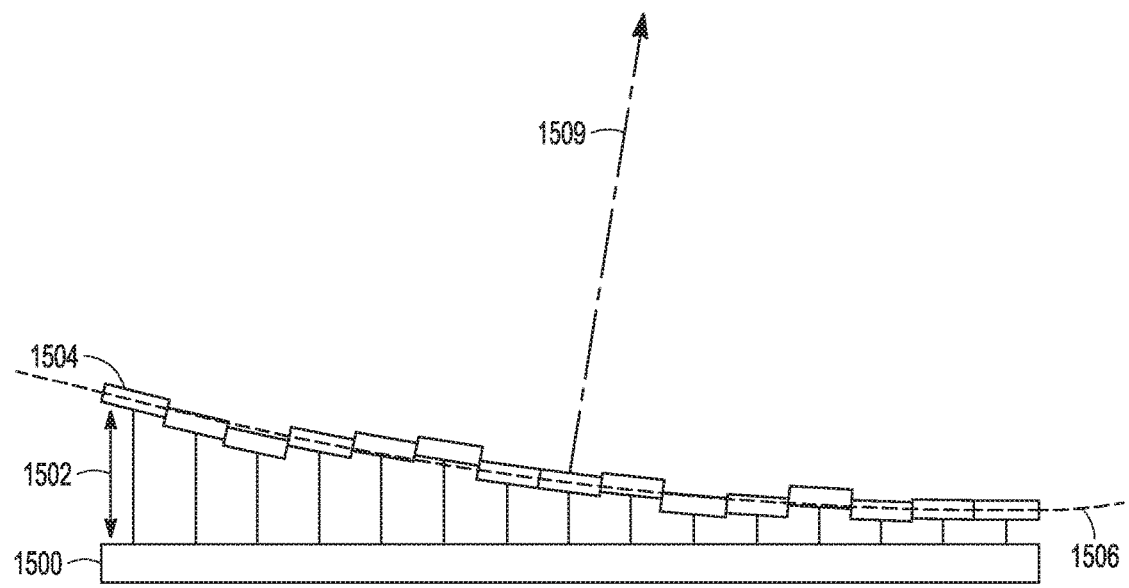
FIG. 16 is an illustration of using piston mirror actuation to produce deviations from the continuous optical surface to provide wavefront correction for optical distortion.

As illustrated in FIG. 16 responsive to command signals from the one or more processors MEMS MMA 1500 can adjust the piston 1502 of mirrors 1504 to induce deviations from continuous mirror surface 1506. This can be done to correct for atmospheric distortion. Adjustments for atmospheric distortion are done in real-time during operation of the detector. Laser 150 emits electromagnetic energy in a similar band to illumination e.g., SWIR and beam steerer scans the laser beam onto scene 158. The optical beam preferably has a flat-top across the cross-section of the beam. Wavefront sensor 176 measures the wavefront of the reflected beam to determine the effects of atmospheric distortion. Processor 108 computes the requisite piston adjustments required to correct the wavefront and provides them as control signals to the MEMS MMA. In high quality, optical detection systems, the ability to accurately remove the effects atmospheric distortion may be critical to achieving useful range information and identifying negative obstacles in the field of regard.

Figure 4:
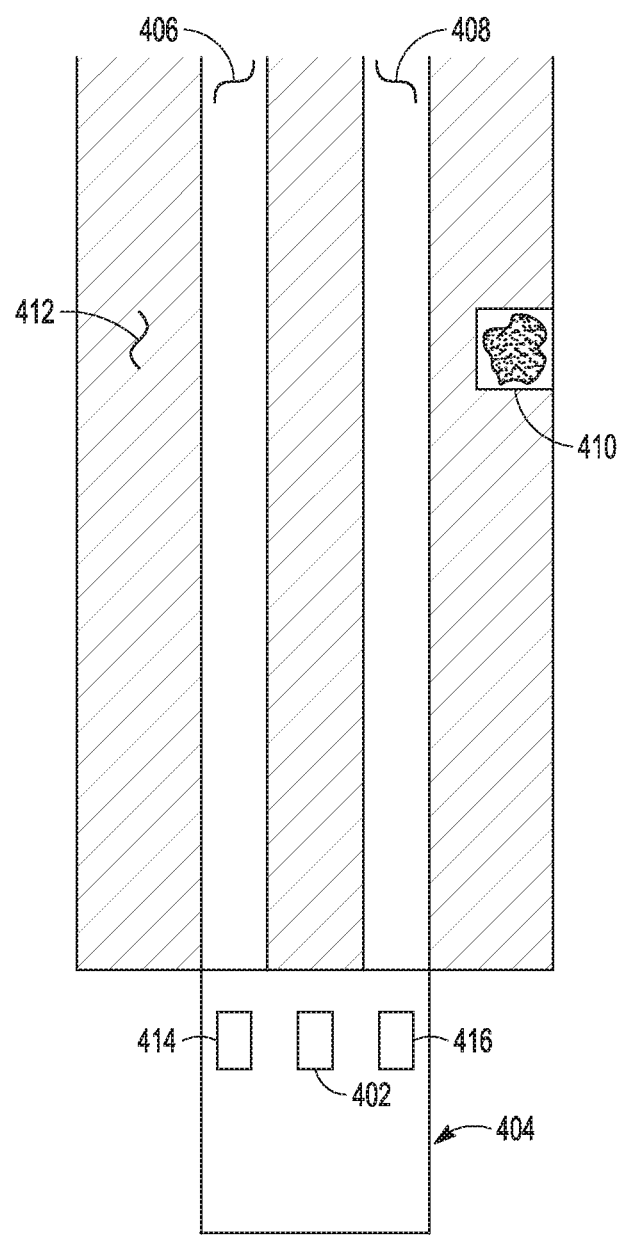
FIG. 4 is a comparison of hypothetical scan areas by an obstacle detector according to aspects of the invention.

FIG. 4 illustrates hypothetical scan areas for a negative object detector 402 on an autonomous vehicle 404. As discussed above, the obstacle detector can be configured to scan high priority areas, for example, in front of the vehicle's tires at 414 and 416 and the respective projected paths 406 and 408. Another example high priority area can include previously identified obstacles at 410. As illustrated in FIG. 4, conventional systems that scan an entire field of regard would scan the entire cross-hashed area 412 in addition to 406, 408, and 410. This system scans only 406 and 408 unless directed by the user of navigational system. As shown in FIG. 4, targeted scanning for obstacles improves efficiency in data capture. A MEMS MMA steering device could, for example, form and independently steer a pair of laser beams to scan paths 406 and 408 at the same time. As candidate negative objects are identified, additional beams can be formed and used to rescan the specific locations of those candidate negative objects to verify whether the object does or does not exist. These additional scans may be performed while the base scans of scan paths 406 and 408 are ongoing so the system can continue to look for and identify additional candidate negative objects. The scans may be done at the same or different wavelength bands. For example, the base scan paths could be conducted at one or more broad spectral bands such as Visible, SWIR or MWIR, the range information returns evaluated to identify candidates and to select specific bands to revisit the candidate objects to verify their existence. The MEMS MMA can use the multiple mirrors at its disposal to form each beam to control the size and intensity profile of the beam to improve resolution to aid in detection. The MEMS MMA can also provide wavefront correction to compensate for atmospheric distortion.

Figure 5:
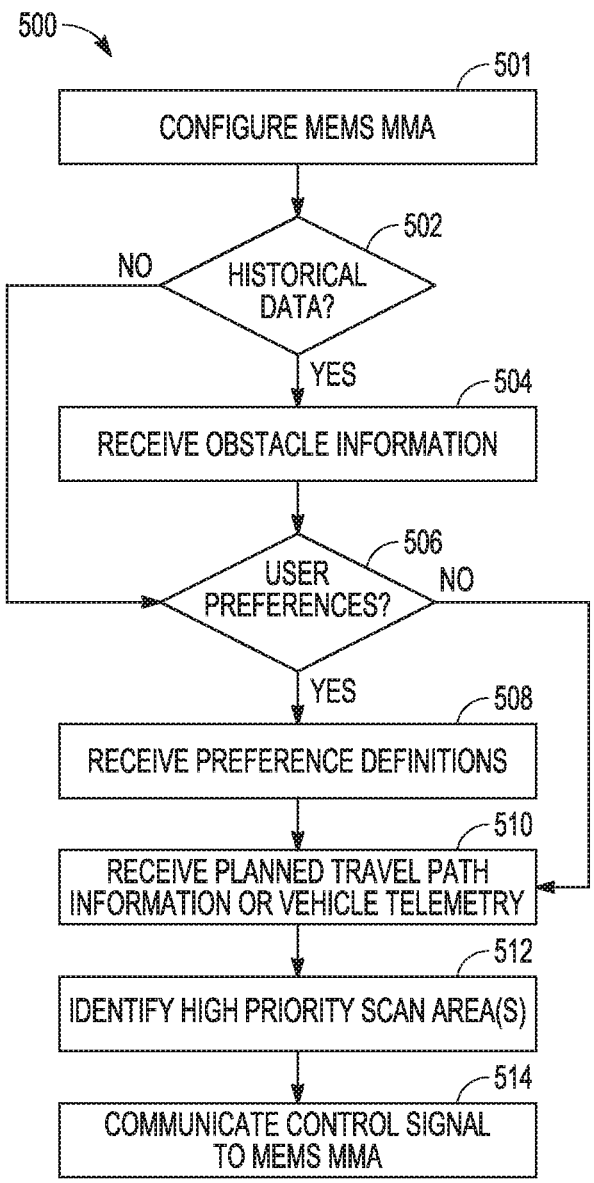
FIG. 5 is a process flow for controlling a scan pattern of a negative object detector according to aspects of the invention.

FIG. 5 is an example process flow 500 for controlling a scan pattern of a negative object detector. The process flow 500 begins at 502 where the MEMS MMA is configured to provide just tip/tilt actuation or tip/tilt/piston actuation or to provide different sections of the MMA with different reflective coatings for independent multi-spectral operation.

Once configured, the process continues at 502 where historical data for given terrain can be retrieved at 504, if the historical data is available, 502 YES. For example, previous scans of the terrain can be stored and made available for subsequent routes over the same terrain. Known obstacles and respective positions can also be stored for subsequent use. In some examples, positions of known obstacles (both positive and negative obstacles) can be used to define high priority areas for scanning. Historical information can also include information on topography and/or contours of the terrain to be travelled. Any features previously identified in the terrain can be targeted as high priority scan areas. This information can be used to initialize or set the number of laser beams required to execute a base scan pattern and an additional scan patterns to verify candidate negative objects, to initialize the size or intensity pattern of the beams, to select wavelength bands (Visible, SWIR or LWIR) or particular wavelengths within the bands, scanning frequency and range or a desired composite scan pattern.

At 508, defined user preferences, if any exist (506 YES), can be retrieved. User preferences can define specific scan patterns for the negative object detector. For example, the defined scan pattern may specify a scan area, a scan range, and a path for the laser to traverse over the scan area. In some examples, user preference can also specify any one or more of the scan area, scan path, and scan range based on current vehicle telemetry (e.g., speed of the vehicle). In further examples, user preferences can specify smaller scan areas based on increases in vehicle speed, and in other examples, different scan patterns can be associated with different ranges of vehicle speed. The user preferences can also specify vehicle characteristics, including wheel or tire size, width of the vehicle, sizing for traversable obstacles (both positive and negative), etc. The wheel or tire size can be specified as a user preference and user preference can be used by a processing component (e.g., 108 of FIG. 1) to tailor a scan pattern to a specific vehicle. In other embodiments, user preferences can specify scan criteria based on terrain information. For example, known roads (e.g., paved) can be associated with scan patterns, scan locations, scan ranges, etc., that account for the road condition, and different preferences can be defined for off-road conditions. In another example, user preferences can include different scan characteristics based on weather conditions. In yet other examples, preferences associated with weather conditions can be used to modify existing scan characteristics.

If historic data exists (502 YES) or user preferences exist (504 YES), that information is retrieved at 504 or 508 respectively. According to one embodiment, the process flow 500 continues at 510, where planned travel path information or current vehicle telemetry (e.g., current speed, current course, current direction, current position, etc.) is received. In other executions, process flow 500 continues at 510, where no historical data in available 502 NO and/or where no user preferences are defined 506 NO. In some embodiments, a planned travel path or current vehicle telemetry can be provided or retrieved from navigation systems connected to a negative object detector. At 512, high priority scan areas can be identified based on at least the planned travel path information or current vehicle telemetry. In some embodiments, high priority scan areas are tailored specifically to current vehicle telemetry or the planned travel path. For example, areas in front of the vehicle's wheels can be scanned as high priority areas, while surrounding areas can be scanned at a lower interval or even omitted. In further examples, scan range can be determined responsive to current speed, with the scan range increasing with increases in vehicle speed. At 514, control signals are communicated to a laser scanner device including the MEMS MMA to steer one or more laser beams to the high priority scan areas. For example, the MEMS MMA can direct the laser beams to areas where measurements indicate a potential negative obstacle. In other examples, steering the laser beam can include revisiting candidate obstacles and/or doing so with an increased refresh rate, as discussed in greater detail below. The MEMS MMA provides the flexibility to concurrently direct one or more laser beams to scan high priority areas to identify candidate negative objects AND direct one or more laser beams to revisit the candidate negative objects at specific locations within the high priority areas.

According to some embodiments, dynamically tailoring scan patterns, scan locations, and/or scan frequency allows detailed interrogation of high priority areas. Such dynamic tailoring can be performed with multiple laser beams with different properties that can adapt according to gathered range and other information. This provides greatly enhanced capabilities over scanning a single laser beam. For example, execution of process flow 500 enables detailed interrogation of high priority areas and enables increases in refresh rate for high priority areas over conventional object detection approaches. In other embodiments, targeted scanning increases the response time for navigation changes, for example, based on higher refresh rates obtained on targeted scan areas. In further embodiments, tailoring the detection ranges (e.g., distance from vehicle) being scanned also increases the response time for navigation changes. As discussed, scan location can be adapted by a processing component (e.g., 108 of FIG. 1) to vehicle motion and terrain changes using inputs from an inertial navigation system (INS) or GPS. In other embodiments, the scan pattern is dynamically adapted to INS inputs, user preference, and/or known locations of obstacles.

According to one embodiment, tailoring of scan patterns, high priority areas, and/or refresh rates can occur as execution of additional processes. For example, steps 512 and 514 may be executed in conjunction with and/or as process 1000 of FIG. 10, described in greater detail below. In further embodiments, the additional processes triggered can depend on the characteristics of the object detected (e.g., where the angle subtended by the object is less than the beam divergence of the object detector).

In some embodiments, a negative object detector can be used in conjunction with inertial navigation system for measurement and existing UGV navigation algorithms to create a map of traversable locations in space. The locations of obstacles identified on the map can then be used by navigation systems to plan routes to avoid negative or positive obstacles. An autonomous vehicle must avoid negative obstacles too large to pass over, unless the wheels can safely traverse the obstacle, and must also avoid positive obstacles too large to pass over.

Figure 6:
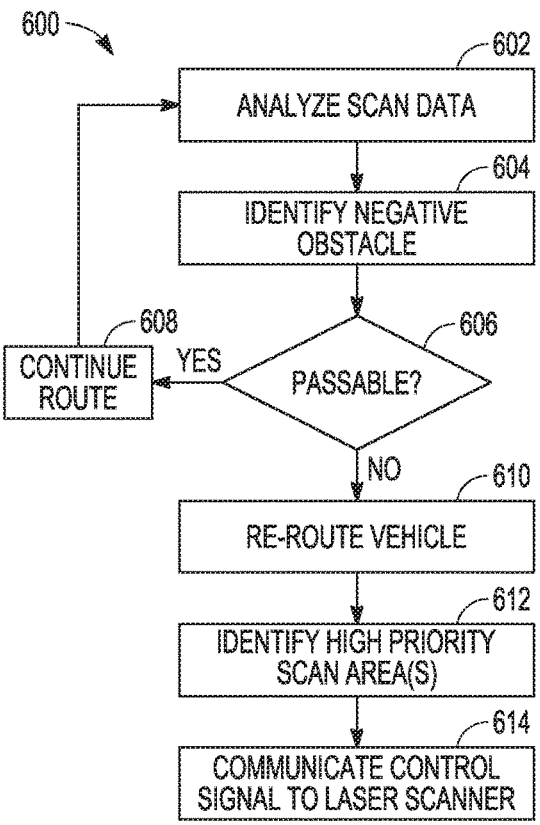
FIG. 6 is a process flow for adapting scan areas responsive to re-routing an autonomous vehicle according to aspects of the invention.

FIG. 6 is an example process flow 600 for adapting scan areas responsive to re-routing an autonomous vehicle. The process flow 600 beings at 602 with analysis of scan data, for example, obtained from a negative object detector. At 604, a negative obstacle is identified from the scan data. For example, discontinuity can be determined from range data obtained by the detector and the discontinuity can be associated with a negative obstacle. In some embodiments, multiple negative object detectors can be used to enable improved estimation of the size of the negative obstacle. With a MEMS MMA, a single object detector can provide a diversity of laser beams to provide the improved estimation of the size of the negative obstacle. According to one embodiment, identifying an obstacle (e.g., a negative obstacle at 604) can occur as part of another process (e.g., process 1000, FIG. 10). In other embodiments, multiple steps of process 600 can be executed in conjunction with or as execution of another process (e.g., 604-606 can be executed as at least part of process 1000, discussed in greater detail below).

Size of the obstacles can be used at 606 to determine if the obstacle is passable. If passable, 606 YES, the autonomous vehicle continues along a current path or planned route at 608, and process flow 600 continues with further analysis of scan data. If the object is determined not passable 606 NO, evasive maneuvers can be executed at 610. In some embodiments, step 610 is executed to re-route an autonomous vehicle towards traversable areas. To facilitate estimation of a size of an obstacle, multiple obstacle detectors may be used. If a size of an obstacle is too large, various known navigation algorithms can be executed as part of step 610, or called as sub-processes executed in conjunction with step 610.

At 612, new high priority scan areas are identified responsive to any new vehicle route or vehicle telemetry information received on the new route. Based on identifying the high priority areas, control signals are communicated to the MEMS MMA of the negative object detector, for example, at 614. According to one embodiment, the process flow 600 is illustrative with respect to identification of negative obstacles, however, process flow 600 can also be executed to detect positive obstacles (e.g., at 604) with the remaining steps executed similarly in response to identifying positive obstacles.

Figure 7:
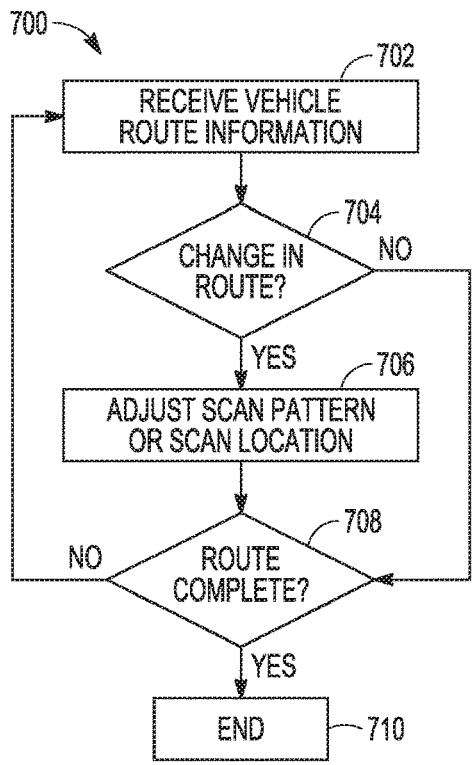
FIG. 7 is a process flow for continuous adjustments to scan patterns and/or scan locations according to aspects of the invention.

FIG. 7 is an example process flow 700 for continuous adjustments to scan patterns and/or scan locations. The process flow 700 begins at 702 with receiving vehicle route information. The vehicle route information can include vehicle telemetry received from navigations systems, including for example GPS and/or INS systems. If a change in route is identified at 704 YES, a current or base scan pattern, scan rate, and/or a current or base scan location can be adjusted at 706 in response to the change in route. Otherwise, process flow 700 continues at 704 NO until the route is complete at 708 YES. A change in route can be based, for example, on a change in a planned travel path. A change in route can also include any change in vehicle telemetry. For example, a change in vehicle speed or direction can trigger adjustments to scan pattern, scan rate, and/or scan location at 706. For example, adjustments to the scan pattern can include targeting a projected path for the wheels of a vehicle. In one embodiment, a MEMS MMA can direct a laser beam to such areas. In another embodiment, the MEMS can adjust the scan pattern to target areas where measurements indicate a potential negative obstacle. In yet other examples, adjusting the scan pattern can include increasing a refresh rate for areas having potential negative obstacles, until the negative obstacle is unambiguously identified or determined traversable.

In some embodiments, scan patterns, scan locations, and/or scan rates can be associated with vehicle speed or speed ranges. Based on information received on the vehicles' current speed a processing component (e.g., 108 of FIG. 1) can select a predefined scan pattern, scan location, and/or scan rate. In further embodiments, the predefined scan pattern, scan location, and/or scan rate can be used by the processing component as minimal criteria that must be met when determining a scan pattern, scan rate, and/or scan location dynamically. In one embodiment, the processing component can be configured to further tailor any predefined criteria to the terrain being traversed, vehicle information, weather conditions, and/or other environmental conditions. In other embodiments, the processing component is configured to dynamically generate a scan pattern, a scan location, and/or a scan rate without any predefined criteria. The process flow 700 repeats the preceding steps via 708 NO, unless the route being traversed by the vehicle is complete at 708 YES, which ends process flow 700 at 710.

Figure 10:
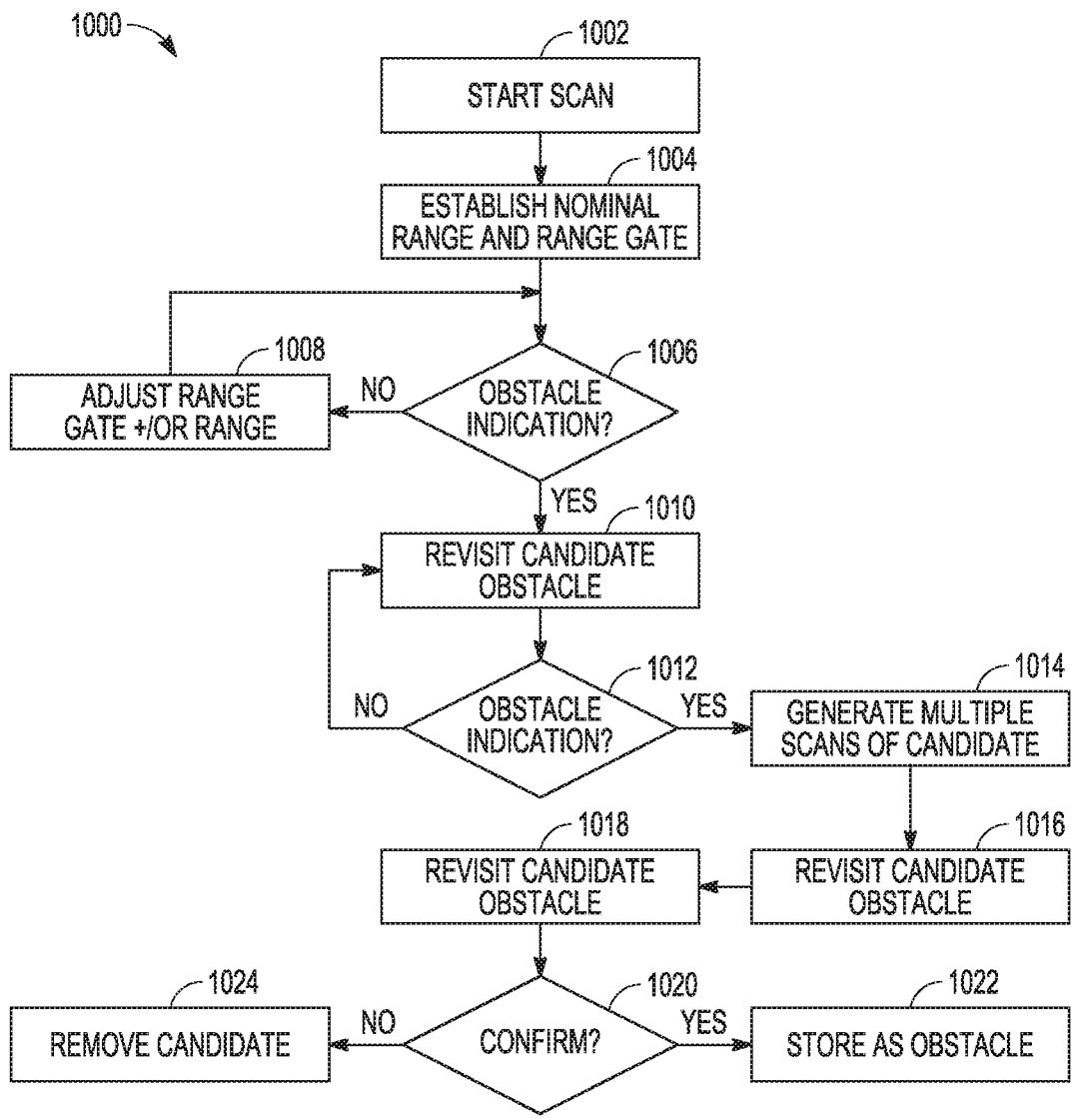
FIG. 10 is an example process flow for tailoring scan functions according to terrain and/or detected object characteristics.

As discussed, the processing for determining a scan area, scan rate, scan location, etc. can be influenced by the terrain and/or characteristics of a scanned object. FIG. 10 illustrates an example process flow 1000 for tailoring scan patterns according to terrain and/or detected object characteristics. In one embodiment, process 1000 can be triggered responsive to determining that for a potential object beam divergence is greater than an angle of the object (e.g., beam 902 of FIGS. 9A-9B for object 906). In one embodiment, process 1000 begins at 1002 with starting scanning locations that are close to the vehicle (e.g., within 1-2 vehicle lengths) to determine a baseline range and trend for the travel plane being traversed by the vehicle at 1004. In further embodiments, step 1002 may be omitted where prior scans have established a trend for the travel plane and/or a baseline range for scanning. Using the nominal range, a range gate can be set on either side of the beam to detect small perturbation in the travel plane. The range gate permits detection of a reflected beam from an emitter as specific interval to limit interference. Range gating for multiple beams can be achieved by time sequencing the beam pulses as to not overlap when returning to the detector. Setting the range gate can occur as part of 1004 or can be set as a separate step (not shown). In some examples, setting the range gate at 1004 can include, dynamically changing the range gate of the range finder to account for slopes where the nominal range gate becomes ineffective to return meaningful range data (e.g., where terrain slopes away). In some embodiments, the system executing process 1000 must be configured to quickly change the range gate of the range finder at 1008 in response to the nominal scan range becoming ineffective 1006 NO. If the range and range gate are effective 1006 YES, scanning continues at 1010. For example, scanning can continue based on speed and terrain characteristics. Optionally, adjustments can be made to the range and/or range gate at 1010 responsive to terrain and/or vehicle telemetry changes.

If an obstacle indication is identified (e.g., detect discontinuity, detect edge, detect wall, etc.) at 1012 YES, multiple scans of the candidate obstacle are taken at 1014. Alternatively, at 1012 scanning continues according to a scan pattern until there is an obstacle indication at 1012 YES. The capture of multiple scans at 1014 can occur in conjunction with continued scanning at 1016. In one embodiment, the terrain in front of an autonomous vehicle is continuously scanned as multiple scans of the candidate obstacle are captured. In other embodiments, scanning may be alternated between the candidate obstacle and the terrain, and in further embodiments, multiple scanners can be used, and each tasked with scanning the candidate object or the terrain at the starting range as assigned by the system responsive to the obstacle indication at 1012 YES.

In some embodiments, generating the obstacle indication yields unambiguous information that an obstacle is present. For example, positive obstacles or negative obstacles where the beam divergence of the laser is less than the angle subtended by the negative obstacle can be identified unambiguously and process 1000 can terminate (not shown). Where the obstacle indication is ambiguous process 1000 continues to eliminate any ambiguity. For example, continued scanning in the region of the candidate obstacle at 1016 can yield more information as the autonomous vehicle approaches the obstacle. Continued scanning at 1016 can include scanning past the candidate obstacle (e.g., a hole) until range readings return to a normal state (e.g., the trend for the travel plane measures within an expected range or limited deviation from previous measurements).

Process 1000 continues with revisiting the candidate obstacle at 1018 with scanning in front and though the obstacle. In some embodiments, the change in angle of the beam as a vehicle approaches the obstacle yields more energy in the obstacle, and provides a stronger intensity of return, for example from a wall of the obstacle (e.g., similar to FIGS. 9A-9B and obstacle 906). In some embodiments, the ratio of energy change can be evaluated to determine if the ratio of energy change matches the ratio of the hole subtense change. For example, with the time between measurements and vehicle speed a projected ratio can be determined and validated against the measurements. At 1020, an obstacle can be confirmed 1020 YES and any location information or other characteristics for the obstacle can be stored for subsequent use at 1022. Alternatively, if the obstacle is not confirmed 1022, information associated the candidate obstacle is deleted at 1024.

In some embodiments, multiple wavelength beams (e.g., 900 nm-1550 nm) can be used to detect obstacles. For example, a first wavelength of 900 nm and a second wavelength of 1550 nm can be selected to improve detection of energy distribution changes resulting from obstacles in a travel path. Thus checking a candidate obstacle at multiple wavelengths can occur as part of 1014-1020, as physical obstacle characteristics are independent of wavelength. In some embodiments, the property that the divergence of a laser is different at two wavelengths can be used to scan negative obstacles with multiple wavelengths. The returns can be reviewed to determine characteristics of the negative obstacle, for example, based on analyzing differences in the data returned from the two wavelengths. In another example, the different wavelengths can be evaluated to determine if the obstacle range is different at different locations as a result of the beams falling within the negative obstacle differently.

According to other embodiments, process 1000 or another process for identifying an obstacle can include a final verification step where the obstacle angular subtense is greater than or equal to the beam divergence. Multiple dimension scans can be used to identify the characteristics of any obstacle. For example, range readings taken in two dimensions yields information on the extent of a hole. Based on the determination of the characteristics of the obstacle, a decision can be made to go around or over the obstacle. According to various the steps illustrated may be executed in different order, and/or various ones of the steps illustrated may be omitted or combined. Process 1000 is described as an example and other embodiments can include fewer or more steps. Instructions for carrying out the various process tasks, process flows, calculations, and generation of signals and other data used in the operation of the negative object detector systems and methods can be implemented in software, firmware, or other computer readable instructions. These instructions are typically stored on any appropriate computer readable media used for storage of computer readable instructions or data structures. Such computer readable media can be any available media that can be accessed by a specially configured computer system or processor, or any specially configured programmable logic device. In some embodiments, process 1000 can be executed repeatedly and the information obtained on any obstacle can be used in subsequent executions. In other examples, the various processes discussed above can be used in conjunction and/or to generate data used in execution of other ones of the processes discussed. In further examples, the processes can be executed in conjunction, in sequence, and where one or more steps of the processes are interleaved during execution. The processes may be executed stepwise, and data obtained for each step made available to other steps and/or other processes and respective steps. In one, data captured during execution of any of the above processes can be saved and reused as part of later executions. The data may be saved on any suitable computer readable media.

According to one embodiment, suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer executable instructions or data structures. Any of the foregoing may be supplemented by, implemented, or incorporated in, specially-designed application-specific integrated circuits (ASICs) or field programmable gate arrays (FPGAs). In some embodiments, specially designed hardware components can be fabricated to include controllers and/or software modules to execute the functions of the negative object detector described. For example, specialized hardware can be configured to perform any one of, or any combination of: operate a laser beam and determine range data; steer the laser beam according to a scan pattern; generate control signals for a waveguide; define a scan pattern, location, and or frequency (e.g., based on vehicle telemetry or a current travel path); and identify a negative obstacle from range data.

When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media. In other embodiments, computational operations may be distributed between multiple computer systems.

According to various embodiments, various optical sources may be used. For example, the optical source may include any suitable source of electromagnetic radiation and for example, may include infrared radiation or visible light.

The methods of the invention can be implemented by computer executable instructions, such as program modules, which are executed by a processor. Generally, program modules include routines, programs, objects, data components, data structures, algorithms, and the like, which perform particular tasks or implement particular data types. Computer executable instructions, associated data structures, and program modules represent examples of program code means for executing steps of the methods disclosed herein. The particular sequence of such executable instructions or associated data structures represents examples of corresponding acts for implementing the functions described in such steps.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A negative obstacle detector comprising:
a laser scanner device including:
one or more optical sources configured to emit laser energy within a specified band;
a Micro-Electro-Mechanical System (MEMS) Micro-Mirror Array (MMA) comprising a plurality of independently and continuously controllable mirrors to tip and tilt each mirror about first and second orthogonal axes, said MEMS MMA partitioned into a plurality of sections, each section including at least one segment of a plurality of said mirrors, wherein the mirrors in the different sections comprise reflective coatings designed to reflect at different wavelengths in the specified band, said MEMS MMA positioned to receive the laser energy and responsive to control signals to tip and tilt the mirrors to form the laser energy into and steer a plurality of laser beams at the different wavelengths over a field of regard of the laser scanner device according to a plurality of discrete scan patterns;
a range detector that generates range information based on reflection of the plurality of laser beams at the different wavelengths; and
at least one processor configured to identify at least one indicator of at least one negative obstacle using the range information at the different wavelengths generated by the range detector.

2. The negative obstacle detector of claim 1, wherein the at least one processor is configured to define the plurality of discrete scan patterns to simultaneously scan different areas within the field of regard.

3. The negative obstacle detector of claim 1, wherein the at least one processor is configured to define at least one of the plurality of discrete scan patterns to scan an area of the field of regard and to define at least one of the plurality of discrete scan patterns to scan a specific location at which the at least one indicator is detected while the scan of the area is ongoing.

4. The negative obstacle detector of claim 3, wherein the at least one processor is configured to adapt the number of discrete scan patterns that scan specific locations as indicators are detected and validated.

5. The negative obstacle detector of claim 4, wherein the at least one processor is configured to adapt the partition of the MEMS MMA to change the number of sections, hence the number of laser beams in accordance with the number of discrete scan patterns required to validate the detected indicators.

6. The negative obstacle detector of claim 1, wherein the at least one processor is configured to simultaneously scan different laser beams at different ranges or speeds within the field of regard.

7. The negative obstacle detector of claim 1, wherein the at least one processor is configured to adapt the partition of the MEMS MMA to change the number of sections, hence the number of laser beams based on a range or relative speed to the field of regard to maintain a specified spatial resolution on target.

8. The negative obstacle detector of claim 1, wherein the reflective coatings in different sections produce laser beams that span a visible band of at least 450 nm-750 nm, a SWIR band of at least 900 nm-2000 nm, and a MWIR of at least 3000 nm-5000 nm each lying within the specified band.

9. The negative obstacle detector of claim 1, wherein the reflective coatings in one section produce a laser beam with wavelengths that span the specified band, wherein the reflective coatings on a plurality of sections produce laser beams at different wavelengths within the specified band.

10. The negative obstacle detector of claim 9, wherein the at least one processor is configured to define at least one of the plurality of discrete scan patterns to scan an area of the field of regard with laser beams that span the specified band and to define at least one of the plurality of discrete scan patterns to scan a specific location at which the at least one indicator is detected with a laser beam at a wavelength within the specified band while the scan of the area is ongoing.

11. The negative obstacle detector of claim 1, wherein the at least one processor is configured to evaluate the range information over the specified band generated by the range detector to estimate a material composition of the negative obstacle and select one of the different wavelengths to scan a specific location at which the indicator is detected to validate the indicator.

12. The negative obstacle detector of claim 1, wherein the mirrors of the MEMS MMA are configured to translate in a third axis orthogonal to a plane containing the first and second orthogonal axes, wherein the at least one processor is configured to:
generate control signals to direct the MEMS MMA to tip, tilt and translate the mirrors in the plurality of sections to form the plurality of laser beams.

13. The negative obstacle detector of claim 1, wherein a surface of a path of travel of an autonomous vehicle is within the field of regard of the laser scanner, wherein the at least one processor is configured to define the plurality of discrete scan patterns to cover at least the surface of the path of travel at estimated positions of one or more portions of the autonomous vehicle that contact the surface of travel.

14. A negative obstacle detector comprising:
a laser scanner device including:
a plurality of optical sources configured to emit laser energy at different wavelengths with a specified band;
a Micro-Electro-Mechanical System (MEMS) Micro-Mirror Array (MMA) comprising a plurality of independently and continuously controllable mirrors to tip and tilt each mirror about first and second orthogonal axes, said MEMS MMA partitioned into a plurality of sections, each section including at least one segment of a plurality of said mirrors, wherein the mirrors in the different sections comprise reflective broadband coatings designed to reflect over the specified band, said MEMS MMA positioned such that the different sections receive the laser energy at the different wavelengths and responsive to control signals to tip and tilt the mirrors to form the laser energy into and steer a plurality of laser beams at the different wavelengths over a field of regard (FOR) of the laser scanner device according to a plurality of discrete scan patterns;
a range detector that generates range information based on reflection of the plurality of laser beams at the different wavelengths; and
at least one processor configured to identify at least one indicator of at least one negative obstacle using the range information at the different wavelengths generated by the range detector.

15. The negative obstacle detector of claim 14, wherein the at least one processor is configured to define at least one of the plurality of discrete scan patterns to scan an area of the FOR and to define at least one of the plurality of discrete scan patterns to scan a specific location at which the at least one indicator is detected while the scan of the area is ongoing.

16. The negative obstacle detector of claim 14, wherein the at least one processor is configured to adapt the number of discrete scan patterns that scan specific locations as indicators are detected and validated.

17. The negative obstacle detector of claim 14, wherein the at least one processor is configured to adapt the partition of the MEMS MMA to change the number of sections, hence the number of laser beams in accordance with the number of discrete scan patterns required to validate the detected indicators.

18. The negative obstacle detector of claim 14, wherein the at least one processor is configured to adapt the partition of the MEMS MMA to change the number of sections, hence the number of laser beams based on a range or relative speed to the field of regard to maintain a specified spatial resolution on target.

19. The negative obstacle detector of claim 14, wherein the at least one processor is configured to define at least one of the plurality of discrete scan patterns to scan an area of the FOR with laser beams that span the specified band and to define at least one of the plurality of discrete scan patterns to scan a specific location at which the at least one indicator is detected with a laser beam at a wavelength within the specified band while the scan of the area is ongoing.

20. The negative obstacle detector of claim 14, wherein the at least one processor is configured to evaluate the range information over the specified band generated by the range detector to estimate a material composition of the negative obstacle and select one of the different wavelengths to scan the specific location at which the indicator is detected to validate the indicator.

21. The negative obstacle detector of claim 14, wherein a surface of a path of travel of an autonomous vehicle is within the field of regard of the laser scanner, wherein the at least one processor is configured to define the plurality of discrete scan patterns to cover at least the surface of the path of travel at estimated positions of one or more portions of the autonomous vehicle that contact the surface of travel.

22. A negative obstacle detector comprising:
a laser scanner device including:
one or more optical sources configured to emit laser energy at a plurality of wavelengths that span a band;
a Micro-Electro-Mechanical System (MEMS) Micro-Mirror Array (MMA) comprising a plurality of independently and continuously controllable mirrors to tip and tilt each mirror about first and second orthogonal axes, said MEMS MMA positioned to receive the laser energy and responsive to control signals tip and tilt the mirrors to form the laser energy into and steer a plurality of laser beams at different wavelengths within the band over a field of regard of the laser scanner device according to a plurality of discrete scan patterns, a surface of a path of travel of an autonomous vehicle is within the field of regard of the laser scanner;
a range detector that generates range information based on reflection of the plurality of laser beams at the different wavelengths; and
at least one processor operatively connected to the MEMS MMA and to the range detector and configured to:
partition the MEMS MMA into a plurality of segments, each segment comprising a plurality of mirrors that tip and tilt to form and steer one of the laser beams;
define at least one discrete scan pattern to scan an area of the field of regard;
generate control signals to direct the MEMS MMA to tip and tilt the mirrors at least one segment to form and independently steer at least one base laser beam over the area of field of regard according to the at least one discrete scan pattern;
identify at least one indicator of at least one hole in the surface of the path of travel using the range information generated by the range detector based on reflection of the at least one base laser beam;
define at least one discrete pattern to scan a specific location at which the at least one indicator is detected;
generate control signals to direct the MEMS MMA to tip and tilt the mirrors at least one segment to form and independently steer at least one indicator laser beam to scan the specific location according to the at least one discrete scan pattern while with the scan of the area of the field of regard with the at least one base laser beam is ongoing, wherein the at least one indicator laser beam includes different wavelengths than the at least one base laser beam; and
validate the at least one indicator of the hole in the surface of the path of travel using the range information generated by the range detector based on reflection of the at least one indicator laser beam.

23. A negative obstacle detector comprising:
one or more optical sources configured to emit laser energy at a plurality of wavelengths that span a band;
a Micro-Electro-Mechanical System (MEMS) Micro-Mirror Array (MMA) comprising a plurality of independently and continuously controllable mirrors to tip and tilt each mirror about first and second orthogonal axes;
a range detector that generates range information based on reflection of the laser energy at the different wavelengths; and
at least one processor operatively connected to the MEMS MMA and the range detector configured to:
generate control signals to direct the MEMS MMA to tip and tilt at least one first segment of the mirrors to form and independently steer at least one base laser beam over a field of regard (FOR) according to at least one discrete scan pattern;

identify at least one indicator of at least one negative obstacle using the range information generated by the range detector based on reflection of the at least one base laser beam;

generate control signals to direct the MEMS MMA to tip and tilt at least one second segment of the mirrors to form and independently steer at least one indicator laser beam to scan a specific location at which the at least one indicator is detected according to at least one discrete scan pattern while the scan of the FOR with the at least one base laser beam is ongoing, wherein the at least one indicator laser beam includes different wavelengths than the at least one base laser beam; and validate the at least one indicator of the negative obstacle using the range information generated by the range detector based on reflection of the at least one indicator laser beam.

* * * * *